US012093808B2

(12) United States Patent
Whatmough

(10) Patent No.: US 12,093,808 B2
(45) Date of Patent: Sep. 17, 2024

(54) MIXED-SIGNAL ARTIFICIAL NEURAL NETWORK ACCELERATOR

(71) Applicant: Arm Limited, Cambridge (GB)

(72) Inventor: Paul Nicholas Whatmough, Cambridge, MA (US)

(73) Assignee: Arm Limited, Cambridge (GB)

( * ) Notice: Subject to any disclaimer, the term of this patent is extended or adjusted under 35 U.S.C. 154(b) by 952 days.

(21) Appl. No.: 17/116,623

(22) Filed: Dec. 9, 2020

(65) Prior Publication Data

US 2022/0180158 A1     Jun. 9, 2022

(51) Int. Cl.
*G06N 3/063* (2023.01)
*G06F 7/544* (2006.01)
*G06F 17/15* (2006.01)

(52) U.S. Cl.
CPC ........... *G06N 3/063* (2013.01); *G06F 7/5443* (2013.01); *G06F 17/15* (2013.01); *G06F 2207/4824* (2013.01)

(58) Field of Classification Search
CPC .................. G06F 7/5543; G06F 17/15; G06F 2207/4824
USPC ........................................................ 708/813
See application file for complete search history.

(56) References Cited

U.S. PATENT DOCUMENTS

2005/0122238 A1* 6/2005 Nomura .................. H03M 5/08
341/53

OTHER PUBLICATIONS

Ningyuan Cao, Muya Chang, and Arijit Raychowdhury. A 65-nm 8-to-3-b 1.0-0.36-V 9.1-1.1-TOPS/W Hybrid-Digital-Mixed-Signal Computing Platform for Accelerating Swarm Robotics. IEEE Journal of Solid-State Circuits, vol. 55, No. 1, Jan. 2020, pp. 49-59. (Year: 2020).*
Shafiee et al., "ISAAC: A Convolutional Neural Network Accelerator with In-Situ Analog Arithmetic in Crossbars," 2016 ACM/IEEE 43rd Annual International Symposium on Computer Architecture (ISCA), Seoul, 2016, pp. 14-26.
Chi et al., "PRIME: A Novel Processing-in-Memory Architecture for Neural Network Computation in ReRAM-Based Main Memory," 2016 ACM/IEEE 43rd Annual International Symposium on Computer Architecture (ISCA), Seoul, 2016, pp. 27-39.

(Continued)

*Primary Examiner* — Jyoti Mehta
*Assistant Examiner* — Jason Todd Ballard
(74) *Attorney, Agent, or Firm* — Leveque Intellectual Property Law, P.C.

(57) ABSTRACT

An artificial neural network (ANN) accelerator is provided. The ANN accelerator includes digital controlled oscillators (DCOs), digital-to-time converters (DTCs) and a mixed-signal multiply-and-accumulate (MAC) array. Each DCO generates a first analog operand signal based on a first digital data value, and transmits the first analog operand signal along a respective column signal line. Each DTC generates a second analog operand signal based on a second digital data value, and transmits the second analog operand signal along a respective row signal line. The mixed-signal MAC array is coupled to the row and column signal lines, and includes mixed-signal MAC units. Each mixed-signal MAC unit includes an integrated clock gate (ICG) that generates a digital product signal based on the first and second analog operand signals, and a counter circuit that increments or decrements a count value stored in a register based on the digital product signal.

18 Claims, 11 Drawing Sheets

(56) References Cited

OTHER PUBLICATIONS

LiKamWa at al., "RedEye: Analog ConvNet Image Sensor Architecture for Continuous Mobile Vision," 2016 ACM/IEEE 43rd Annual International Symposium on Computer Architecture (ISCA), Seoul, 2016, pp. 255-266.
Fick et al., "Analog Computation in Flash Memory for Datacenter-scale AI Inference in a Small Chip," Hot Chips 30, 201.
https://en.wikipedia.org/wiki/Time-to-digital_converter; last visited Dec. 3, 2020.
Jouppi et al., "In-Datacenter Performance Analysis of a Tensor Processing Unit", SIGARCH Comput. Archit. News 45, 2 (Jun. 2017), 1 12. DOI:https://doi.org/10.1145/3140659.3080246.

* cited by examiner

MIXED-SIGNAL ARTIFICIAL NEURAL NETWORK ACCELERATOR

BACKGROUND

The present disclosure relates to computer systems. More particularly, the present disclosure relates to computer systems including artificial neural networks (ANNs).

ANNs, such as deep neural networks (DNNs), convolutional neural networks (CNNs), etc., are a popular solution to a wide array of challenging classification, recognition and regression problems. However, many ANNs require a large number of calculations involving a large number of filter weights and activations, which presents a significant challenge with respect to access, storage and performance, particularly for mobile and other power or storage-constrained devices. An ANN hardware accelerator accelerates these calculations, such as, for example, general matrix multiplication (GEMM) operations performed by DNNs, convolution operations performed by CNNs, etc.

CNNs typically do not perform native convolution operations due to the complicated dataflow and expensive datapaths that are required. Instead, native convolution operations are converted into GEMM operations, which are then executed more efficiently by a central processing unit (CPU), a specialized processor, an ANN accelerator that includes systolic multiply-and-accumulate (MAC) arrays, a non-volatile memory (NVM) accelerator for neural networks, etc. An NVM accelerator includes both digital processing circuitry and one or more analog NVM crossbar arrays that perform GEMM operations, such as matrix multiply-accumulate (MAC) operations. For example, the filter weights and activations (i.e., input feature maps or IFMs) for a convolution layer of a CNN may be converted into an expanded format (e.g., IM2COL format), and then processed as GEMM operations by an ANN accelerator to generate output feature maps (OFMs). An activation or scaling function and a bias may be applied to the OFMs by the convolution layer or a separate activation layer, and then the OFMs are provided as the activations (i.e., IFMs) for the next layer of the CNN.

In an ANN accelerator with digital MAC arrays, one of the biggest hardware costs, in terms of power and area, are the flip-flops required to pipeline the movement of operands over the typically large array. Other closely-related architectures share broadly similar costs for moving operands around a large silicon area. In an NVM accelerator with analog NVM crossbar arrays, undesirable noise and linearity issues may significantly reduce the accuracy of the ANN. NVM accelerators also suffer from the prohibitive costs of ADC and DAC circuits.

DETAILED DESCRIPTION

Figure 1:
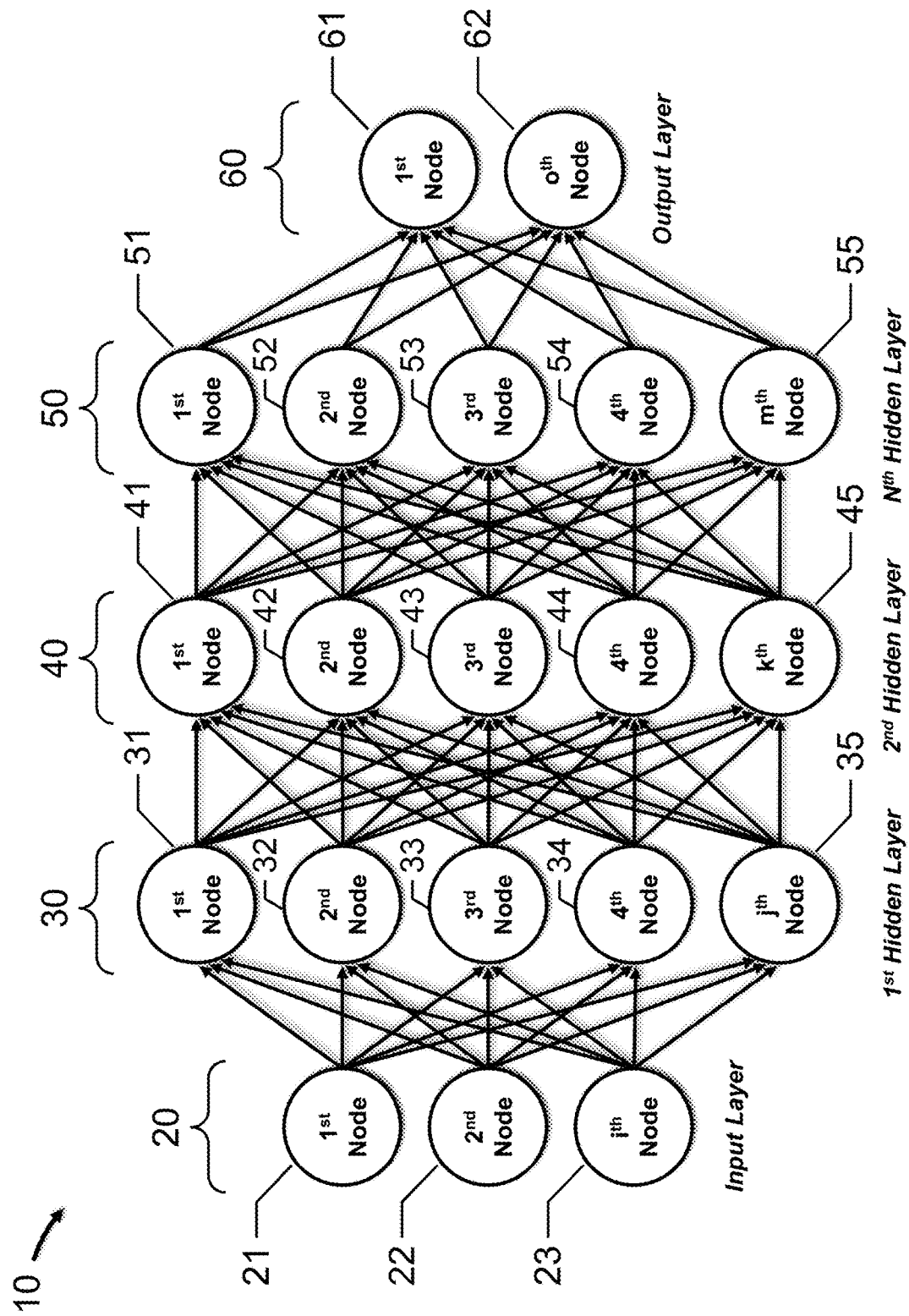
FIG. 1 depicts an ANN, in accordance with an embodiment of the present disclosure.

Embodiments of the present disclosure will now be described with reference to the drawing figures, in which like reference numerals refer to like parts throughout.

Embodiments of the present disclosure advantageously improve the distribution of operands in ANN accelerators by eliminating the need for flip-flops, ADCs and DACs. More particularly, digital operands are encoded as analog signals using digitally-controlled oscillators (DCOs) and digital-to-time converters (DTCs), and then distributed for processing by an array of mixed-signal (i.e., analog and digital) MAC units. Advantageously, analog operand distribution reduces hardware cost because a single wire can encode a continuous value which could represent as much data as, for example, an 8-wire digital signal, while the digital value that is output by each element of the mixed-signal MAC array avoids expensive ADCs.

In one embodiment, a mixed-signal multiply-and-accumulate (MAC) unit includes an integrated clock gate (ICG) and a counter circuit. The ICG includes a clock port coupled to a first analog operand signal line, an enable port coupled to a second analog operand signal line, and an output port. The ICG is configured to receive, at the clock port, a first analog operand signal, receive, at the enable port, a second analog operand signal, generate a digital product signal based on the first analog operand signal and the second analog operand signal, and output, from the output port, the digital product signal. The counter circuit includes an input port coupled to the ICG output port, a register, an adder/subtractor circuit and an output port. The counter circuit is configured to receive, at the input port, the digital product signal, increment or decrement a count value stored in the register based on the digital product signal, and output, from the output port, the count value.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tan h function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

A multi-layer perceptron (MLP) is an ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

FIG. 1 depicts ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes. Many variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

Figure 2A:
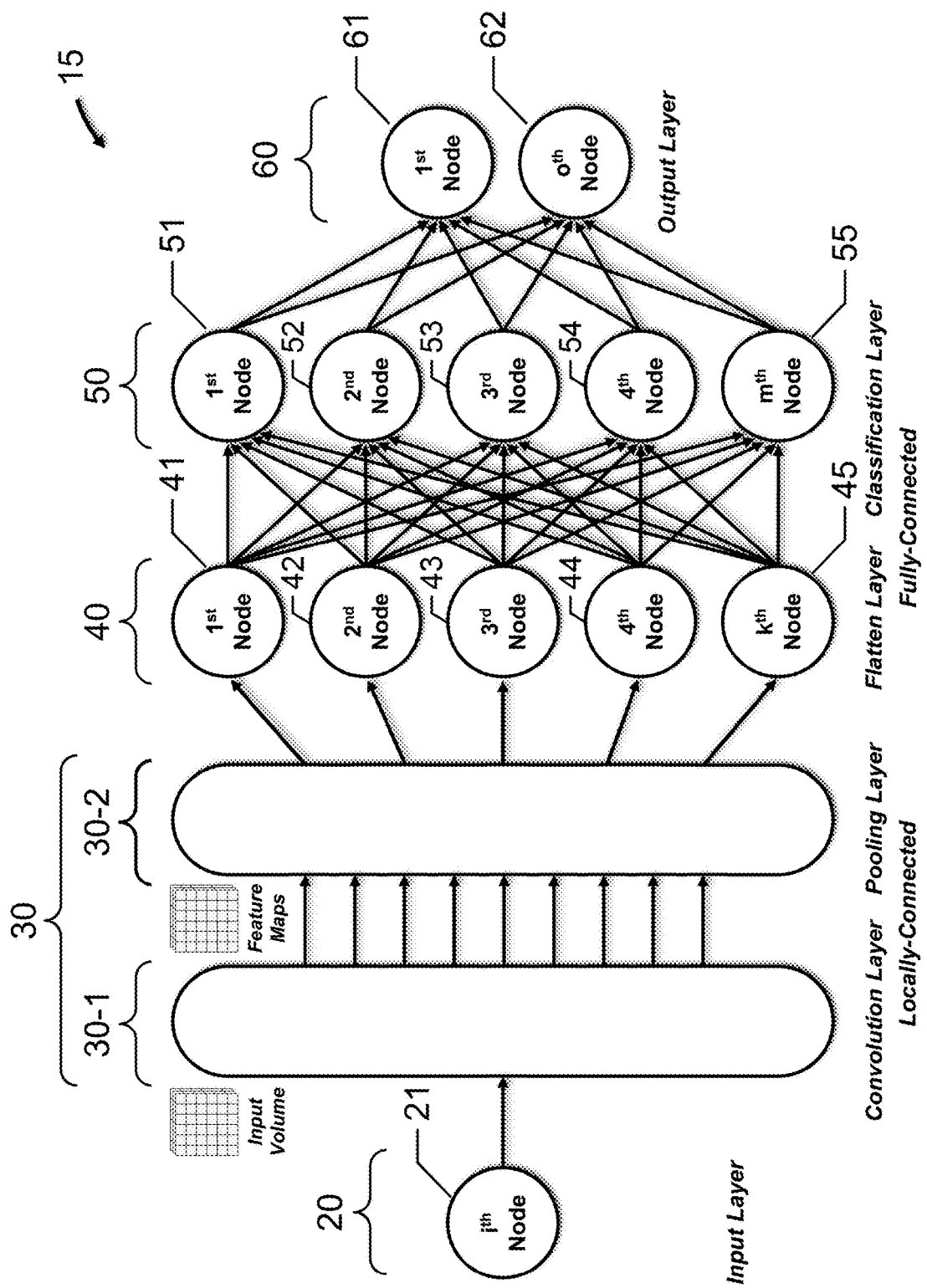
FIG. 2A depicts a CNN, in accordance with an embodiment of the present disclosure.

FIG. 2A depicts CNN 15, in accordance with an embodiment of the present disclosure. CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image may be presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume to generate one element of an output volume. An activation function and a bias may be applied to each element of the output volume, and the output volume is then provided as the input volume to the next layer. The activation function and bias may be applied by each convolutional layer node or by the nodes of a subsequent locally-connected layer, such as an ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as output feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, MAC operations, are used extensively by CNNs, as well as other ANNs.

Figure 2B:
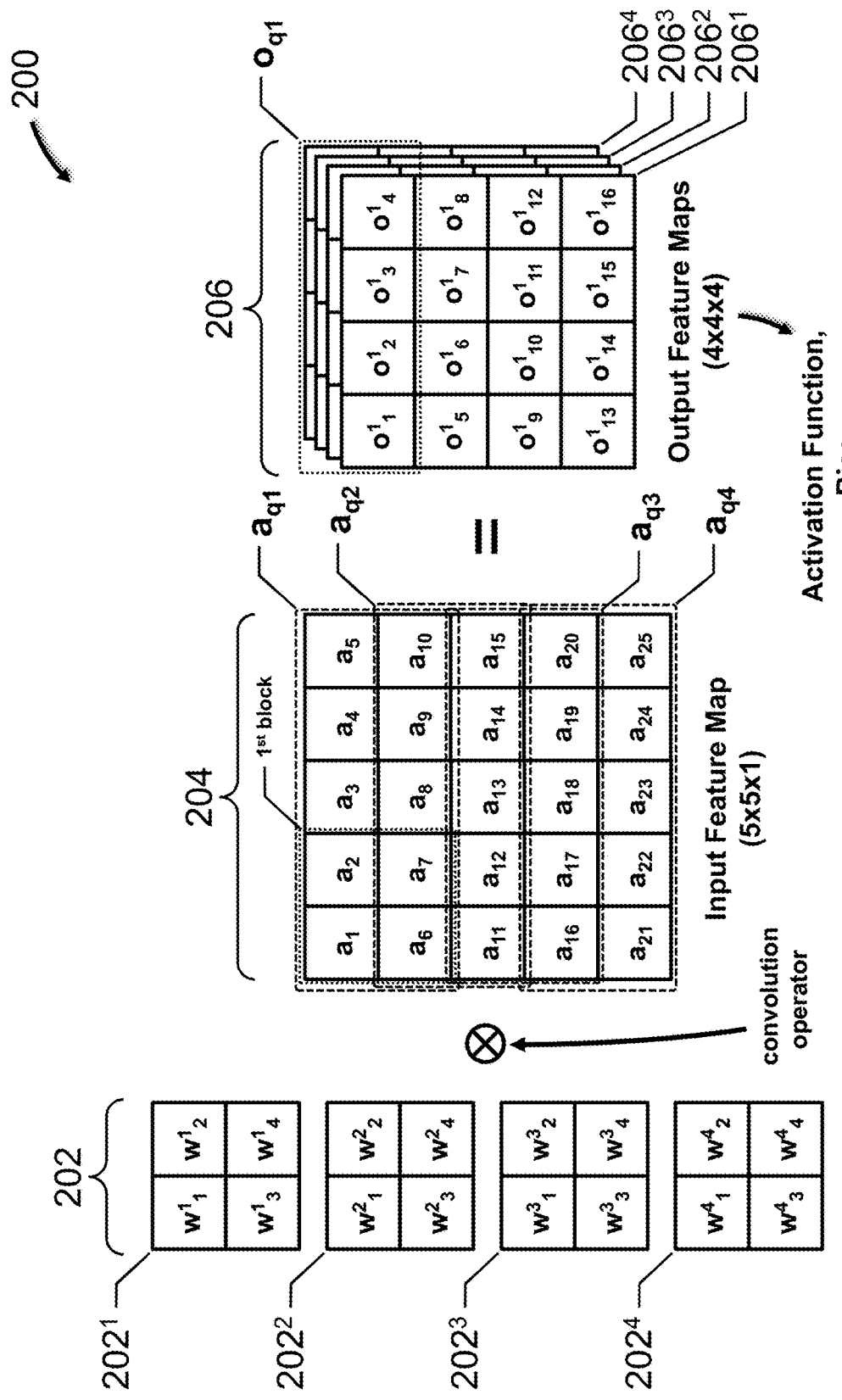
FIG. 2B depicts a convolution layer operation within a convolutional layer of a CNN, in accordance with an embodiment of the present disclosure.

FIG. 2B depicts convolution layer operation 200 within convolutional layer 30-1 of CNN 15, in accordance with an embodiment of the present disclosure.

A convolutional layer generally includes M filters, C input channels, C input feature maps (i.e., one input feature map for each input channel) and M output feature maps (i.e., one output feature map for each filter). Each filter has C weight sets (i.e., each filter has a weight set for each input channel), and is convolved across the input feature maps to produce an output feature map corresponding to that filter. Convolutional layers generally require the movement of large amounts of data, generate a significant computational load, and require buffers of considerable size to store intermediate values.

In this embodiment, convolutional layer 30-1 includes four weight matrices or filters 202, i.e., filter $202^1$, $202^2$, $202^3$ and $202^4$, one input channel, one input feature map 204 and four output feature maps 206, i.e., $206^1$, $206^2$, $206^3$ and $206^4$. Each filter 202 is convolved across input feature map 204 to produce an output feature map 206 corresponding to that filter, i.e., output feature map $206^1$ corresponds to filter $202^1$, output feature map $206^2$ corresponds to filter $202^2$, output feature map $206^3$ corresponds to filter $202^3$, and output feature map $206^4$ corresponds to filter $202^4$. For illustration purposes, each filter $202^1$, $202^2$, $202^3$ and $202^4$ is a 2×2×1 weight matrix, input feature map 204 is a 5×5×1 input data matrix, and each output feature map $206^1$, $206^2$, $206^3$ and $206^4$ is a 4×4 output data matrix. In this embodiment, with a stride of 1 and no padding, the total number of MAC operations performed by convolution layer operation 200 is (2×2×1)×(4×4)×4 or 256.

For ease of discussion, input feature map 204 may be divided into four overlapping portions or quadrants. The first quadrant (i.e., $a_{q1}$) includes the first and second rows, i.e., $a_1$, $a_2$, $a_3$, $a_4$, $a_5$ and $a_6$, $a_7$, $a_8$, $a_9$, $a_{10}$, the second quadrant includes the second and third rows, i.e., $a_6$, $a_7$, $a_8$, $a_9$, $a_{10}$ and $a_{11}$, $a_{12}$, $a_{13}$, $a_{14}$, $a_{15}$, the third quadrant includes the third and fourth rows, i.e., $a_{11}$, $a_{12}$, $a_{13}$, $a_{14}$, $a_{15}$ and $a_{16}$, $a_{17}$, $a_{18}$, $a_{19}$, $a_{20}$, and the fourth quadrant includes the fourth and fifth rows, i.e., $a_{16}$, $a_{17}$, $a_{18}$, $a_{19}$, $a_{20}$ and $a_{21}$, $a_{22}$, $a_{23}$, $a_{24}$, $a_{25}$.

Figure 2C:
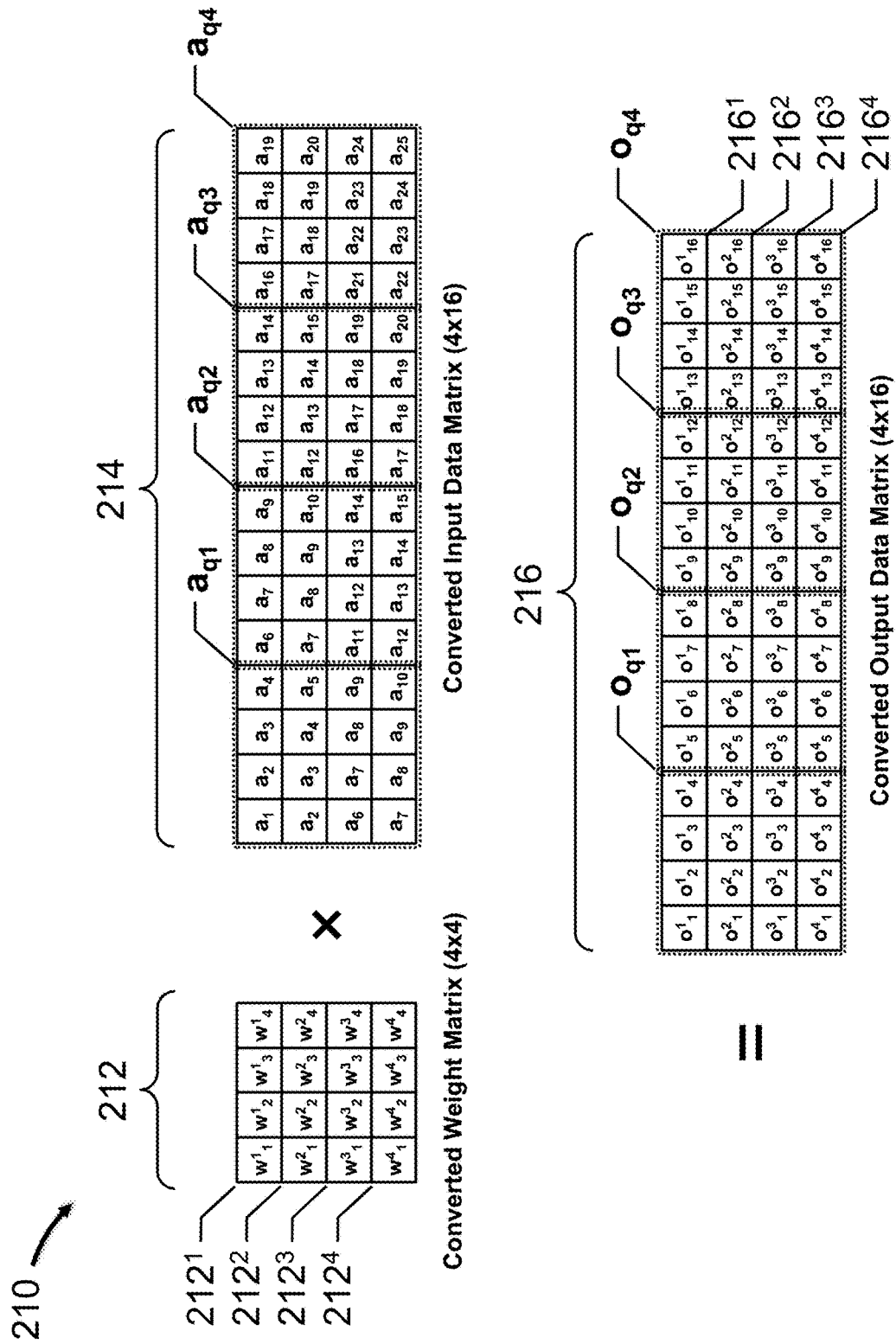
FIG. 2C depicts a converted convolutional operation within a convolutional layer of a CNN, in accordance with an embodiment of the present disclosure.

Similarly, output feature maps 206 may be divided into four, three dimensional portions or quadrants. The first quadrant (i.e., $o_{q1}$) includes the first row of each output feature map $206^1$, $206^2$, $206^3$ and $206^4$, i.e., $o^1_1$, $o^1_2$, $o^1_3$, $o^1_4$, $o^2_2$, $o^2_2$, $o^2_2$, $o^2_2$, $o^3_3$, $o^3_3$, $o^3_3$, $o^3_3$, $o^4_4$, $o^4_4$, $o^4_3$ and $o^4_4$. The second quadrant (not shown for clarity) includes the second row of each output feature map $206^1$, $206^2$, $206^3$ and $206^4$, i.e., $o^1_5$, $o^1_6$, $o^1_7$, $o^1_8$, $o^2_2$, $o^2_2$, $o^2_2$, $o^2_2$, $o^3_3$, $o^3_3$, $o^3_3$, $o^3_3$, $o^4_4$, $o^4_4$, $o^4_7$ and $o^4_8$. The third quadrant (not shown for clarity) includes the third row of each output feature map $206^1$, $206^2$, $206^3$ and $206^4$, i.e., $o^1_9$, $o^1_{10}$, $o^1_{11}$, $o^1_{12}$, $o^2_9$, $o^2_{10}$, $o^2_{11}$, $o^2_{12}$, $o^3_9$, $o^3_{10}$, $o^3_{11}$, $o^3_{12}$, $o^4_9$, $o^4_{10}$, $o^4_{11}$, and $o^4_{12}$. The fourth quadrant (not shown for clarity) includes the fourth row of each output feature map $206^1$, $206^2$, $206^3$ and $206^4$, i.e., $o^1_{13}$, $o^1_{14}$, $o^1_{15}$, $o^1_{16}$, $o^2_{13}$, $o^2_{14}$, $o^2_{15}$, $o^2_{16}$, $o^3_{13}$, $o^3_{14}$, $o^3_{15}$, $o^3_{16}$, $o^4_{13}$, $o^4_{14}$, $o^4_{15}$, and $o^4_{16}$. All of the elements from quadrants $o_{q1}$, $o_{q2}$, $o_{q3}$ and $o_{q4}$ are depicted in FIG. 2C.

The convolution operations performed on the first quadrant (i.e., $a_{q1}$) of input feature map 204 are now discussed in detail.

For output feature map $206^1$, element $o^1_1$ is the dot product of filter $202^1$ and the first block (i.e., $a_1$, $a_2$, $a_6$ and $a_7$) of the first quadrant $a_{q1}$ of input feature map 204, element $o^1_2$ is the dot product of filter $202^1$ and the second block (i.e., $a_2$, $a_3$, $a_7$ and $a_8$) of the first quadrant $a_{q1}$ of input feature map 204, element $o^1_3$ is the dot product of filter $202^1$ and the third block (i.e., $a_3$, $a_4$, $a_8$ and $a_9$) of the first quadrant $a_{q1}$ of input feature map 204, and $o^1_4$ is the dot product of filter $202^1$ and the fourth block (i.e., $a_4$, $a_5$, $a_9$ and $a_{10}$) of the first quadrant $a_{q1}$ of input feature map 204.

More particularly, the dot product of filter $202^1$ and the first block of the first quadrant $a_{q1}$ is equal to $w^1_1 \cdot a_1 + w^1_2 \cdot a_2 + w^1_3 \cdot a_6 + w^1_4 \cdot a_7$ (i.e., $o^1_1$). The dot product of filter $202^1$ and the second block of the first quadrant $a_{q1}$ is equal to $w^1_1 \cdot a_2 + w^1_2 \cdot a_3 + w^1_3 \cdot a_7 + w^1_4 \cdot a_8$ (i.e., $o^1_2$). The dot product of filter $202^1$ and the third block of the first quadrant $a_{q1}$ is equal to $w^1_1 \cdot a_3 + w^1_2 \cdot a_4 + w^1_3 \cdot a_8 + w^1_4 \cdot a_9$ (i.e., $o^1_3$). The dot product of filter $202^1$ and the fourth block of the first quadrant $a_{q1}$ is equal to $w^1_1 \cdot a_4 + w^1_2 \cdot a_5 + w^1_3 \cdot a_9 + w^1_4 \cdot a_{10}$ (i.e., $o^1_4$).

For output feature map $206^2$, element $o^2_1$ is the dot product of filter $202^2$ and the first block (i.e., $a_1$, $a_2$, $a_6$ and $a_7$) of the first quadrant $a_{q1}$ of input feature map 204, output feature map element $o^2_2$ is the dot product of filter $202^2$ and the second block (i.e., $a_2$, $a_3$, $a_7$ and $a_8$) of the first quadrant $a_{q1}$ of input feature map 204, output feature map element $o^2_3$ is the dot product of filter $202^2$ and the third block (i.e., $a_3$, $a_4$, $a_5$ and $a_9$) of the first quadrant $a_{q1}$ of input feature map 204, and output feature map element $o^2_4$ is the dot product of filter $202^2$ and the fourth block (i.e., $a_4$, $a_5$, $a_9$ and $a_{10}$) of the first quadrant $a_{q1}$ of input feature map 204.

More particularly, the dot product of filter $202^2$ and the first block of the first quadrant $a_{q1}$ is equal to $w^2_1 \cdot a_1 + w^2_2 \cdot a_2 + w^2_3 \cdot a_6 + w^2_4 \cdot a_7$ (i.e., $o^2_1$). The dot product of filter $202^2$ and the second block of the first quadrant $a_{q1}$ is equal to $w^2_1 \cdot a_2 + w^2_2 \cdot a_3 + w^2_3 \cdot a_7\ w^2_4 \cdot a_8$ (i.e., $o^2_2$). The dot product of filter $202^2$ and the third block of the first quadrant $a_{q1}$ is equal to $w^2_1 \cdot a_3 + w^2_2 \cdot a_4 + w^2_3 \cdot a_8 + w^2_4 \cdot a_9$ (i.e., $o^2_3$). The dot product of filter $202^2$ and the fourth block of the first quadrant $a_{q1}$ is equal to $w^2_1 \cdot a_4 + w^2_2 \cdot a_5 + w^2_3 \cdot a_9 + w^2_4 \cdot a_{10}$ (i.e., $o^2_4$).

For output feature map $206^3$, element $o^3_1$ is the dot product of filter $202^3$ and the first block (i.e., $a_1$, $a_2$, $a_6$ and $a_7$) of the first quadrant $a_{q1}$ of input feature map 204, output feature map element $o^3_2$ is the dot product of filter $202^3$ and the second block (i.e., $a_2$, $a_3$, $a_7$ and $a_8$) of the first quadrant $a_{q1}$ of input feature map 204, output feature map element $o^3_3$ is the dot product of filter $202^3$ and the third block (i.e., $a_3$, $a_4$, $a_5$ and $a_9$) of the first quadrant $a_{q1}$ of input feature map 204, and output feature map element $o^3_4$ is the dot product of filter $202^3$ and the fourth block (i.e., $a_4$, $a_5$, $a_9$ and $a_{10}$) of the first quadrant $a_{q1}$ of input feature map 204.

More particularly, the dot product of filter $202^3$ and the first block of the first quadrant $a_{q1}$ is equal to $w^3_1 \cdot a_1 + w^3_2 \cdot a_2 + w^3_3 \cdot a_6 + w^3_4 \cdot a_7$ (i.e., $o^3_1$). The dot product of filter $202^3$ and the second block of the first quadrant $a_{q1}$ is equal to $w^3_1 \cdot a_2 + w^3_2 \cdot a_3 + w^3_3 \cdot a_7 + w^3_4 \cdot a_8$ (i.e., $o^3_2$). The dot product of filter $202^3$ and the third block of the first quadrant $a_{q1}$ is equal to $w^3_1 \cdot a_3 + w^3_2 \cdot a_4 + w^3_3 \cdot a_8 + w^3_4 \cdot a_9$ (i.e., $o^3_3$). The dot product of filter $202^3$ and the fourth block of the first quadrant $a_{q1}$ is equal to $w^3_1 \cdot a_4 + w_2 \cdot a_5 + w^3_3 \cdot a_9 + w^3_4 \cdot a_{10}$ (i.e., $o^3_4$).

For output feature map $206^4$, element $o^4_1$ is the dot product of filter $202^4$ and the first block (i.e., $a_1$, $a_2$, $a_6$ and $a_7$) of the first quadrant $a_{q1}$ of input feature map 204, output feature map element $o^4_2$ is the dot product of filter $202^4$ and the second block (i.e., $a_2$, $a_3$, $a_7$ and $a_8$) of the first quadrant $a_{q1}$ of input feature map 204, output feature map element $o^4_3$ is the dot product of filter $202^4$ and the third block (i.e., $a_3$, $a_4$, $a_8$ and $a_9$) of the first quadrant $a_{q1}$ of input feature map 204, and output feature map element $o^4_4$ is the dot product of filter $202^4$ and the fourth block (i.e., $a_4$, $a_5$, $a_9$ and $a_{10}$) of the first quadrant $a_{q1}$ of input feature map 204.

More particularly, the dot product of filter $202^4$ and the first block of the first quadrant $a_{q1}$ is equal to $w^4_1 \cdot a_1 + w^4_2 \cdot a_2 + w^4_3 \cdot a_6 + w^4_4 \cdot a_7$ (i.e., $o^4_1$). The dot product of filter $202^4$ and the second block of the first quadrant $a_{q1}$ is equal to $w^4_1 \cdot a_2 + w^4_2 \cdot a_3 + w^4_3 \cdot a_7 + w^4_4 \cdot a_8$ (i.e., $o^4_2$). The dot product of filter $202^4$ and the third block of the first quadrant $a_{q1}$ is equal to $w^4_1 \cdot a_3 + w^4_2 \cdot a_4 + w^4_3 \cdot a_8 + w^4_4 \cdot a_9$ (i.e., $o^4_3$). The dot product of filter $202^4$ and the fourth block of the first quadrant $a_{q1}$ is equal to $w^4_1 \cdot a_4 + w^4_2 \cdot a_5 \; w^4_3 \cdot a_9 \; w^4_4 \cdot a_{10}$ (i.e., $o^4_4$).

The convolution operations performed on the remaining three quadrants of input feature map 204 are done in the same manner. The second quadrant of input feature map 204 also includes four blocks, i.e., the first block of includes $a_6$, $a_7$, $a_{11}$ and $a_{12}$, the second block includes $a_7$, $a_8$, $a_{12}$ and $a_{13}$, the third block includes $a_8$, $a_9$, $a_{13}$ and $a_{14}$, and the fourth block includes $a_9$, $a_{10}$, $a_{14}$ and $a_{15}$. The third quadrant of input feature map 204 also includes four blocks, i.e., the first block of includes $a_{11}$, $a_{12}$, $a_{16}$ and $a_{17}$, the second block includes $a_{12}$, $a_{13}$, $a_{17}$ and $a_{18}$ the third block includes $a_{13}$, $a_{14}$, $a_{18}$ and $a_{19}$, and the fourth block includes $a_{14}$, $a_{15}$, $a_{19}$ and $a_{20}$. The fourth quadrant of input feature map 204 also includes four blocks, i.e., the first block of includes $a_{16}$, $a_{17}$, $a_{21}$ and $a_{22}$, the second block includes $a_{17}$, $a_{18}$, $a_{22}$ and $a_{23}$, the third block includes $a_{18}$, $a_{19}$, $a_{23}$ and $a_{24}$, and the fourth block includes $a_{19}$, $a_{20}$, $a_{24}$ and $a_{25}$.

For the second quadrant of output feature map $206^1$, element $o^1_5$ is the dot product of filter $202^1$ and the first block of the second quadrant of input feature map 204, element $o^1_6$ is the dot product of filter $202^1$ and the second block of the second quadrant of input feature map 204, element $o^1_7$ is the dot product of filter $202^1$ and the third block of the second quadrant of input feature map 204, and element $o^1_8$ is the dot product of filter $202^1$ and the fourth block of the second quadrant of input feature map 204. For the second quadrant of output feature map $206^2$, elements $o^2_5$, $o^2_6$, $o^2_7$, and $o^2_8$ are calculated in the same manner using filter $202^2$. For the second quadrant of output feature map $206^3$, elements $o^3_5$, $o^3_6$, $o^3_7$, and $o^3_8$ are calculated in the same manner using filter $202^3$. For the second quadrant of output feature map $206^4$, elements $o^4_5$, $o^4_6$, $o^4_7$, and $o^4_8$ are calculated in the same manner using filter $202^4$.

For the third quadrant of output feature map $206^1$, element $o^1_9$ is the dot product of filter $202^1$ and the first block of the third quadrant of input feature map 204, element $o^1_{10}$ is the dot product of filter $202^1$ and the second block of the third quadrant of input feature map 204, element $o^1_{11}$ is the dot product of filter $202^1$ and the third block of the third quadrant of input feature map 204, and element $o^1_{12}$ is the dot product of filter $202^1$ and the fourth block of the third quadrant of input feature map 204. For the third quadrant of output feature map $206^2$, elements $o^2_9$, $o^2_{10}$, $o^2_{11}$, and $o^2_{12}$ are calculated in the same manner using filter $202^2$. For the third quadrant of output feature map $206^3$, elements $o^3_9$, $o^3_{10}$, $o^3_{11}$, and $o^3_{12}$ are calculated in the same manner using filter $202^3$. For the third quadrant of output feature map $206^4$, elements $o^4_9$, $o^4_{10}$, $o^4_{11}$, and $o^4_{12}$ are calculated in the same manner using filter $202^4$.

For the fourth quadrant of output feature map $206^1$, element $o^1_{13}$ is the dot product of filter $202^1$ and the first block of the fourth quadrant of input feature map 204, element $o^1_{14}$ is the dot product of filter $202^1$ and the second block of the fourth quadrant of input feature map 204, element $o^1_{15}$ is the dot product of filter $202^1$ and the third block of the fourth quadrant of input feature map 204, and element $o^1_{16}$ is the dot product of filter $202^1$ and the fourth block of the fourth quadrant of input feature map 204. For the fourth quadrant of output feature map $206^2$, elements $o^2_{13}$, $o^2_{14}$, $o^2_{15}$, and $o^2_{16}$ are calculated in the same manner using filter $202^2$. For the fourth quadrant of output feature map $206^3$, elements $o^3_{13}$, $o^3_{14}$, $o^3_{15}$, and $o^3_{16}$ are calculated in the same manner using filter $202^3$. For the fourth quadrant of output feature map $206^4$, elements $o^4_{13}$, $o^4_{14}$, $o^4_{15}$, and $o^4_{16}$ are calculated in the same manner using filter $202^4$.

An activation function and a bias may be applied to each element of output feature maps 206, which are then provided as the input feature maps 204 to the next layer. An activation function and bias may be applied after each element of output feature maps 206 is calculated, after all of the elements of output feature maps 206 are calculated, or by a subsequent locally-connected layer, such as an ReLU layer.

Similar to the fully-connected layer calculations for ANNs, convolution operations may be recast as generic matrix multiplication (GEMM) operations, and implemented in an ANN hardware accelerator using one or more arrays of MAC units, an NVM accelerator with one or more analog NVM crossbar arrays, etc. The filter weights and activations (i.e., input feature maps or IFMs) for the convolution operation are converted into an expanded format (e.g., IM2COL format), and then processed as GEMM operations by the ANN hardware accelerator to generate output feature maps (OFMs).

FIG. 2C depicts a converted convolutional operation 210 within convolutional layer 30-1 of CNN 15, in accordance with an embodiment of the present disclosure.

In this embodiment, convolution layer operation 200 has been converted into a simple matrix multiplication operation by converting filter 202 into converted weight matrix 212, converting input feature map 204 into converted input data matrix 214, and converting output feature maps 206 into converted output data matrix 216. Converted weight matrix 212 (4×4) and converted input data matrix 214 (4×16) are multiplied to generate converted output data matrix 216 (4×16), which includes output data sets $216^1$, $216^2$, $216^3$ and $216^4$ (each 1×16). Output data sets $216^1$, $216^2$, $216^3$ and $216^4$ are then reformed into output feature maps $206^1$, $206^2$, $206^3$ and $206^4$ (each 4×4), respectively.

Converted weight matrix 212 includes converted weight sets $212^1$, $212^2$, $212^3$ and $212^4$. Converted weight set $212^1$ includes the elements of filter $202^1$, i.e., $w^1_1$, $w^1_2$, $w^1_3$ and $w^1_4$ arranged in a single (first) row. Converted weight set $212^2$ includes the elements of filter $202^2$, i.e., $w^2_1$, $w^2_2$, $w^2_3$ and $w^2_4$ flattened into a single (second) row. Converted weight set $212^3$ includes the elements of filter $202^3$, i.e., $w^3_1$, $w^3_2$, $w^3_3$ and $w^3_4$ flattened into a single (third) row. Converted weight set $212^4$ includes the elements of filter $202^4$, i.e., $w^4_1$, $w^4_2$, $w^4_3$ and $w^4_4$ flattened into a single (fourth) row.

Converted input data matrix 214 includes the elements of input feature map 204 recast as a larger matrix that implements the convolution operation as a simple matrix multiplication operation. Due to the mechanics of the convolution operation (discussed above), certain elements of input feature map 204 are duplicated once, twice or three times to generate converted output data matrix 216. Generally, each row of converted weight matrix 212 is a filter, each column of converted input data matrix 214 is a block of input data upon which each filter operates, and each dot product calculation, i.e., the multiplication of each row by each column, generates a different element of converted output data matrix 216.

For ease of discussion, converted input data matrix 214 may be divided into four portions or quadrants, i.e., $a_{q1}$, $a_{q2}$, $a_{q3}$ and $a_{q4}$, and converted output data matrix 216 may be divided into four portions or quadrants, i.e., $o_{q1}$, $o_{q2}$, $o_{q3}$ and $o_{q4}$.

The first quadrant $a_{q1}$ of converted input data matrix 214 includes the four blocks of the first quadrant of input feature map 204, each block arranged as a column. Similarly, the second quadrant $a_{q2}$ of converted input data matrix 214 includes the four blocks of the second quadrant of input feature map 204, each block arranged as a column. The third quadrant $a_{q3}$ of converted input data matrix 214 includes the four blocks of the third quadrant of input feature map 204, each block arranged as a column. And, the fourth quadrant $a_{q4}$ of converted input data matrix 214 includes the four blocks of the fourth quadrant of input feature map 204, each block arranged as a column.

More particularly, the first column of the first quadrant $a_{q1}$ of converted input data matrix 214 includes elements $a_1$, $a_2$, $a_6$ and $a_7$, which are the same elements in the same sequence (i.e., row-major order) as the first block of the first quadrant of input feature map 204. The second column of the first quadrant $a_{q1}$ of converted input data matrix 214 includes elements $a_2$, $a_3$, $a_7$ and $a_8$, which are the same elements in the same sequence (i.e., row-major order) as the second block of the first quadrant of input feature map 204. The third column of the first quadrant $a_{q1}$ of converted input data matrix 214 includes elements $a_3$, $a_4$, $a_8$ and $a_9$, which are the same elements in the same sequence (i.e., row-major order) as the third block of the first quadrant of input feature map 204. The fourth column of the first quadrant $a_{q1}$ of converted input data matrix 214 includes elements $a_4$, $a_5$, $a_9$ and $a_{10}$, which are the same elements in the same sequence (i.e., row-major order) as the fourth block of the first quadrant of input feature map 204. And so on for quadrants $a_{q2}$, $a_{q3}$ and $a_{q4}$ of converted input data matrix 214.

The first row of the first quadrant $o_{q1}$ of converted output data matrix 216 includes elements $o^1_1$, $o^1_2$, $o^1_3$ and $o^1_4$, which are the same elements in the same sequence as the first row of the first quadrant of output feature map $206^1$. The second row of the first quadrant ow of converted output data matrix 216 includes elements $o^2_1$, $o^2_2$, $o^2_3$ and $o^2_4$, which are the same elements in the same sequence as the first row of the first quadrant of output feature map $206^2$. The third row of the first quadrant ow of converted output data matrix 216 includes elements $o^3_1$, $o^3_2$, $o^3_3$ and $o^3_4$, which are the same elements in the same sequence as the first row of the first quadrant of output feature map $206^3$. The fourth row of the first quadrant $o_{q1}$ of converted output data matrix 216 includes elements $o^4_1$, $o^4_2$, $o^4_3$ and $o^4_4$, which are the same elements in the same sequence as the first row of the first quadrant of output feature map $206^4$. And so on for quadrants $o_{q2}$, $o_{q3}$ and $o_{q4}$ of converted output data matrix 216.

To generate the first quadrant $o_{q1}$ of converted output data matrix 216, converted weight matrix 212 and the first quadrant $a_{q1}$ of converted input data matrix 214 are multiplied together. For the first row of the first quadrant $o_{q1}$, element $o^1_1$ is the dot product of the first row of converted weight matrix 212 and the first column of converted input data matrix 214, i.e., $o^1_1$ is equal to $w^1_1 \cdot a_1 + w^1_2 \cdot a_2 + w^1_3 \cdot a_6 + w^1_4 \cdot a_7$. Element $o^1_2$ is the dot product of the first row of converted weight matrix 212 and the second column of converted input data matrix 214, i.e., $o^1_2$ is equal to $w^1_1 \cdot a_2 + w^1_2 \cdot a_3 + w^1_3 \cdot a_7 + w^1_4 \cdot a_8$. Element $o^1_3$ is the dot product of the first row of converted weight matrix 212 and the third column of converted input data matrix 214, i.e., $o^1_3$ is equal to $w^1_1 \cdot a_3 + w^1_2 \cdot a_4 + w^1_3 \cdot a_8 + w^1_4 \cdot a_9$. Element $o^1_4$ is the dot product of the first row of converted weight matrix 212 and the fourth column of converted input data matrix 214, i.e., $o^1_4$ is equal to $w^1_1 \cdot a_4 + w^1_2 \cdot a_5 + w^1_3 \cdot a_9 + w^1_4 \cdot a_{10}$. The elements of the second, third and fourth rows the first quadrant $o_{q1}$ of converted output data matrix 216, i.e., elements $o^2_1$, $o^2_2$, $o^2_3$, $o^2_4$, $o^3_1$, $o^3_2$, $o^3_3$, $o^3_4$, $o^4_1$, $o^4_2$, $o^4_3$ and $o^4_4$, are calculated in the same manner using the second, third and fourth rows of converted weight matrix 212, respectively.

To generate the second quadrant $o_{q2}$ of converted output data matrix 216, converted weight matrix 212 and the second quadrant $a_{q2}$ of converted input data matrix 214 are multiplied together. For the first row of the second quadrant $o_{q2}$, element $o^1_5$ is the dot product of the first row of converted weight matrix 212 and the fifth column of converted input data matrix 214, i.e., $o^1_5$ is equal to $w^1_1 \cdot a_6 + w^1_2 \cdot a_7 + w^1_3 \cdot a_{11} + w^1_4 \cdot a_{12}$. Element $o^1_6$ is the dot product of the first row of converted weight matrix 212 and the sixth column of converted input data matrix 214, i.e., $o^1_6$ is equal to $w^1_1 \cdot a_7 + w^1_2 \cdot a_8 + w^1_3 \cdot a_{12} + w^1_4 \cdot a_{13}$. Element $o^1_7$ is the dot product of the first row of converted weight matrix 212 and the seventh column of converted input data matrix 214, i.e., $o^1_7$ is equal to $w^1_1 \cdot a_8 + w^1_2 \cdot a_9 + w^1_3 \cdot a_{13} + w^1_4 \cdot a_{14}$. Element $o^1_8$ is the dot product of the first row of converted weight matrix 212 and the eighth column of converted input data matrix 214, i.e., $o^1_8$ is equal to $w^1_1 \cdot a_9 + w^1_2 \cdot a_{10} + w^1_3 \cdot a_{14} + w^1_4 \cdot a_{15}$. The elements of the second, third and fourth rows the second quadrant $o_{q2}$ of converted output data matrix 216, i.e., elements $o^2_5$, $o^2_6$, $o^2_7$, $o^2_8$, $o^3_5$, $o^3_6$, $o^3_7$, $o^3_8$, $o^4_5$, $o^4_6$, $o^4_7$ and $o^4_8$, are calculated in the same manner using the second, third and fourth rows of converted weight matrix 212, respectively.

To generate the third quadrant $o_{q3}$ of converted output data matrix 216, converted weight matrix 212 and the third quadrant $a_{q3}$ of converted input data matrix 214 are multiplied together. For the first row of the third quadrant $o_{q3}$, element $o^1_9$ is the dot product of the first row of converted weight matrix 212 and the ninth column of converted input data matrix 214, i.e., $o^1_9$ is equal to $w^1_1 \cdot a_{11} + w^1_2 \cdot a_{12} + w^1_3 \cdot a_{16} + w^1_4 \cdot a_{17}$. Element $o^1_{10}$ is the dot product of the first row of converted weight matrix 212 and the $10^{th}$ column of converted input data matrix 214, i.e., $o^1_9$ is equal to $w^1_1 \cdot a_{12} +$ $w^1_2 \cdot a_{13} + w^1_3 \cdot a_{17} + w^1_4 \cdot a_{18}$. Element $o^1_{11}$ is the dot product of the first row of converted weight matrix 212 and the 11$^{th}$ column of converted input data matrix 214, i.e., $o^1_{11}$ is equal to $w^1_1 \cdot a_{13} + w^1_2 \cdot a_{14} + w^1_3 \cdot a_{18} + w^1_4 \cdot a_{19}$. Element $o^1_{12}$ is the dot product of the first row of converted weight matrix 212 and the 12$^{th}$ column of converted input data matrix 214, i.e., $o^1_{12}$ is equal to $w^1_1 \cdot a_{14} + w^1_2 \cdot a_{15} + w^1_3 \cdot a_{19} + w^1_4 \cdot a_{20}$. The elements of the second, third and fourth rows the third quadrant $o_{q3}$ of converted output data matrix 216, i.e., elements $o^2_9$, $o^2_{10}$, $o^2_{11}$, $o^2_{12}$, $o^3_9$, $o^3_{10}$, $o^3_{11}$, $o^3_{12}$, $o^4_9$, $o^4_{10}$, $o^4_{11}$ and $o^4_{12}$, are calculated in the same manner using the second, third and fourth rows of converted weight matrix 212, respectively.

To generate the fourth quadrant $o_{q4}$ of converted output data matrix 216, converted weight matrix 212 and the fourth quadrant $a_{q4}$ of converted input data matrix 214 are multiplied together. For the first row of the fourth quadrant $o_{q4}$, element $o^1_{13}$ is the dot product of the first row of converted weight matrix 212, and the 13$^{th}$ column of converted input data matrix 214, i.e., $o^1_{13}$ is equal to $w^1_1 \cdot a_{16} + w^1_2 \cdot a_{17} + w^1_3 \cdot a_{21} + w^1_4 \cdot a_{22}$. Element $o^1_{14}$ is the dot product of the first row of converted weight matrix 212 and the 14$^{th}$ column of converted input data matrix 214, i.e., $o^1_{14}$ is equal to $w^1_1 \cdot a_{17} + w^1_2 \cdot a_{18} + w^1_3 \cdot a_{22} + w^1_4 \cdot a_{23}$. Element $o^1_{15}$ is the dot product of the first row of converted weight matrix 212 and the 15$^{th}$ column of converted input data matrix 214, i.e., $o^1_{15}$ is equal to $w^1_1 \cdot a_{18} + w^1_2 \cdot a_{19} + w^1_3 \cdot a_{23} + w^1_4 \cdot a_{24}$. Element $o^1_{16}$ is the dot product of the first row of converted weight matrix 212 and the 16$^{th}$ column of converted input data matrix 214, i.e., $o^1_{16}$ is equal to $w^1_1 \cdot a_{19} + w^1_2 \cdot a_{20} + w^1_3 \cdot a_{24} + w^1_4 \cdot a_{25}$. The elements of the second, third and fourth rows the fourth quadrant $o_{q4}$ of converted output data matrix 216, i.e., elements $o^2_{13}$, $o^2_{14}$, $o^2_{15}$, $o^2_{16}$, $o^3_{13}$, $o^3_{14}$, $o^3_{15}$, $o^3_{16}$, $o^4_{13}$, $o^4_{14}$, $o^4_{15}$ and $o^4_{16}$, are calculated in the same manner using the second, third and fourth rows of converted weight matrix 212, respectively.

Figure 3A:
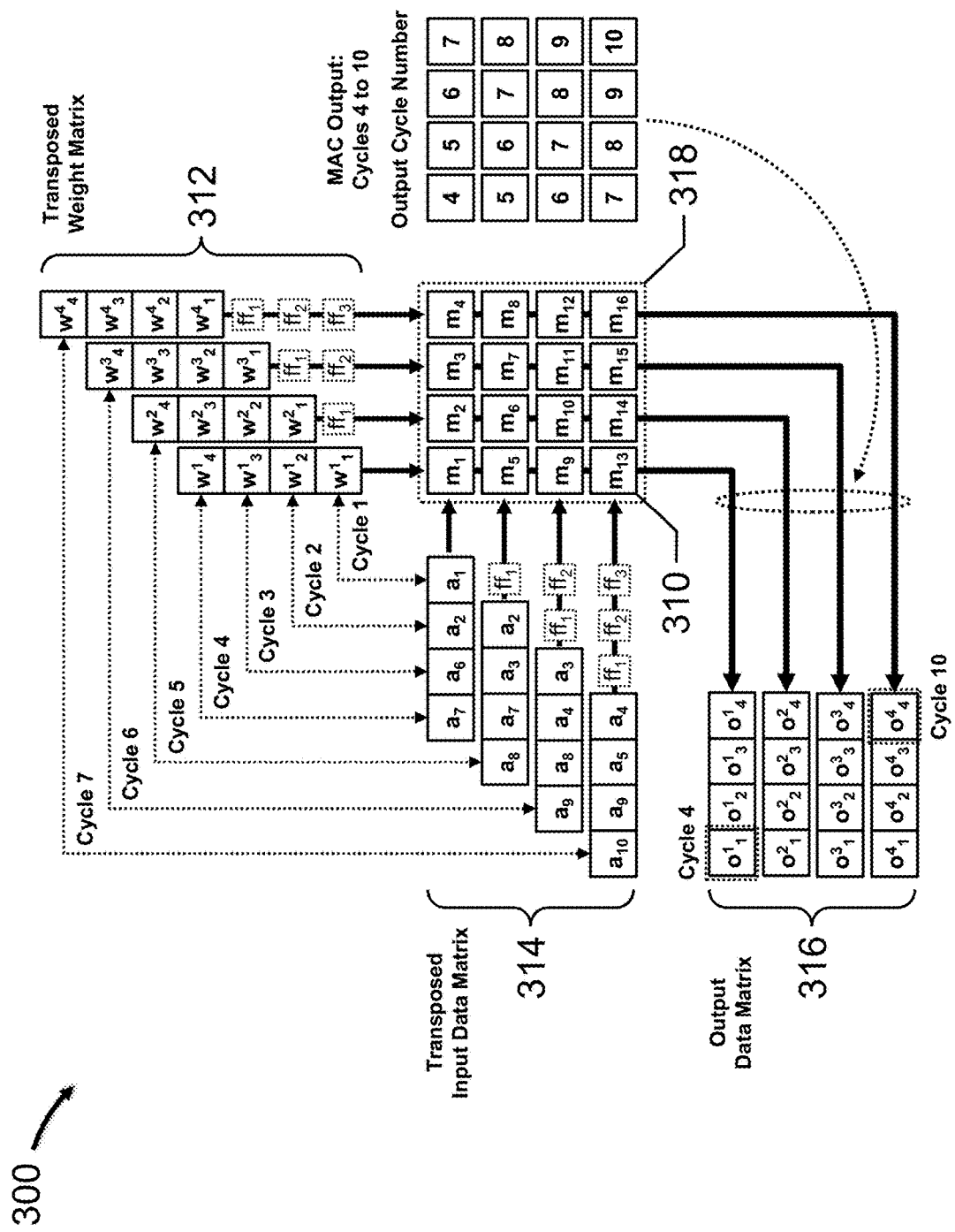
FIG. 3A depicts a data flow diagram for a digital MAC array.

FIG. 3A depicts a data flow diagram 300 for digital MAC array 318.

GEMM operations may be implemented in a dedicated ANN hardware accelerator that includes an array 318 of digital MAC units 310 that perform digital MAC operations. In this embodiment, digital MAC array 318 is a systolic, output stationary array that implements converted convolution operation 210 using a 4×4 array of digital MAC units $310.m_1, \ldots, 310.m_{16}$. The orientation of transposed weight matrix 312, transposed input data matrix 314, and transposed output data matrix 316 relative to digital MAC array 318 simplifies illustration; other orientations are also contemplated.

As discussed above, each digital MAC unit 310 calculates a dot product, between a row of converted weight matrix 212 and a column of converted input data matrix 214, to generate an element of converted output data matrix 216. Generally, a digital MAC unit includes, inter alia, a multiplier, an adder and a storage register. Each digital MAC unit is reset by clearing or zeroing its storage register prior to, or at the start of, a new dot product calculation.

Generally, elements from converted weight matrix 212 are read from local memory, enter digital MAC array 318 at the first row of digital MAC units 310, i.e., $310.m_1$, $310.m_2$, $310.m_3$ and $310.m_4$, and propagate one digital MAC unit down at the beginning of each processing cycle. Similarly, elements from converted input data matrix 214 are read from local memory, enter digital MAC array 318 at the first column of digital MAC units 310, i.e., $310.m_1$, $310.m_5$, $310.m_9$ and $310.m_{13}$, and propagate one digital MAC unit to the right at the beginning of each processing cycle.

The dot product calculations performed by digital MAC unit $310.m_1$ for the first quadrant $a_{q1}$ of converted input data matrix 214 is discussed in detail below, while the dot product calculations performed by the remaining digital MAC units 310 of digital MAC array 318 for the first quadrant $a_{q1}$ of converted input data matrix 214 are summarized below.

Digital MAC unit $310.m_1$ calculates the dot product of the first row of converted weight matrix 212 (i.e., converted weight set 212$^1$) and the first column of converted input data matrix 214 to generate element $o^1_1$ of converted output data matrix 216. During the first processing cycle, digital MAC unit $310.m_1$ receives $a_1$ and $w^1_1$ from local memory, multiplies $a_1$ and $w^1_1$ to generate an intermediate product, adds the intermediate product to the value stored in the storage register (i.e., 0), and stores the accumulated result back in the storage register. During the second processing cycle, digital MAC unit $310.m_1$ transmits $a_1$ to digital MAC unit $310.m_2$ and $w^1_1$ to digital MAC unit $310.m_5$, receives $a_2$ and $w^1_2$ from local memory, multiplies $a_2$ and $w^1_2$ to generate an intermediate product, adds the intermediate product to the value stored in the storage register, and stores the accumulated result back in the storage register.

During the third processing cycle, digital MAC unit $310.m_1$ transmits $a_2$ to digital MAC unit $310.m_2$ and $w^1_2$ to digital MAC unit $310.m_5$, receives $a_3$ and $w^1_3$ from local memory, multiplies $a_3$ and $w^1_3$ to generate an intermediate product, adds the intermediate product to the value stored in the storage register, and stores the accumulated result back in the storage register. During the fourth processing cycle, digital MAC unit $310.m_1$ transmits $a_3$ to digital MAC unit $310.m_2$ and $w^1_3$ to digital MAC unit $310.m_5$, receives $a_4$ and $w^1_4$ from the local memory, multiplies $a_4$ and $w^1_4$ to generate an intermediate product, adds the intermediate product to the value stored in the storage register, stores the accumulated result back in the storage register, and then outputs the value stored in the storage register as element $o^1_1$. During the fifth processing cycle, digital MAC unit $310.m_1$ transmits $a_4$ to digital MAC unit $310.m_2$ and $w^1_4$ to digital MAC unit $310.m_5$, and then waits for the next sequence of operations to begin.

The remainder of the first row of digital MAC array 318 includes digital MAC units $310.m_2$, $310.m_3$ and $310.m_4$.

After an initial delay of one processing cycle, digital MAC unit $310.m_2$ receives weights from the first delay register $ff_1$ and input data from digital MAC unit $310.m_1$, transmits weights to digital MAC unit $310.m_6$ and input data to digital MAC unit $310.m_3$, and calculates the dot product of the second row of converted weight matrix 212 (i.e., converted weight set 212$^2$) and the first column of converted input data matrix 214 to generate element $o^1_2$ of converted output data matrix 216. The initial delay of one processing cycle allows the delay pipeline (i.e., delay register $ff_1$) to be filled with weights transferred from memory, and the input data to become available from digital MAC unit $310.m_1$. At the end of the fifth processing cycle, digital MAC unit $310.m_2$ outputs element $o^1_2$.

After an initial delay of two processing cycles, digital MAC unit $310.m_3$ receives weights from the second delay register $ff_2$ and input data from digital MAC unit $310.m_2$, transmits weights to digital MAC unit $310.m_7$ and input data to digital MAC unit $310.m_4$, and calculates the dot product of the third row of converted weight matrix 212 (i.e., converted weight set 212$^3$) and the first column of converted input data matrix 214 to generate element $o^1_3$ of converted output data matrix 216. The initial delay of two processing cycles allows the delay pipeline (i.e., delay registers $ff_1$ and $ff_2$) to be filled with weights transferred from memory, and the input data to become available from digital MAC unit $310.m_2$. At the end of the sixth processing cycle, digital MAC unit $310.m_3$ outputs element $o^1_3$.

After an initial delay of three processing cycles, digital MAC unit $310.m_4$ receives weights from the third delay register $ff_3$ and input data from digital MAC unit $310.m_3$, transmits weights to digital MAC unit $310.m_8$, and calculates the dot product of the fourth row of converted weight matrix 212 (i.e., converted weight set $212^4$) and the first column of converted input data matrix 214 to generate element $o^1_4$ of converted output data matrix 216. The initial delay of three processing cycles allows the delay pipeline (i.e., delay registers $ff_1$, $ff_2$ and $ff_3$) to be filled with weights transferred from memory, and the input data to become available from digital MAC unit $310.m_3$. At the end of the seventh processing cycle, digital MAC unit $310.m_4$ outputs element $o^1_4$.

The second row of digital MAC array 318 includes digital MAC units $m_5$, $m_6$, $m_7$ and $m_8$.

After an initial delay of one processing cycle, digital MAC unit $310.m_5$ receives weights from digital MAC unit $310.m_1$ and input data from a first delay register $ff_1$, transmits weights to digital MAC unit $310.m_9$ and input data to digital MAC unit $310.m_6$, and calculates the dot product of the first row of converted weight matrix 212 (i.e., converted weight set $212^1$) and the second column of converted input data matrix 214 to generate element $o^2_1$ of converted output data matrix 216. The initial delay of one processing cycle allows the delay pipeline (i.e., delay register $ff_1$) to be filled with input data transferred from memory, and the weights to become available from digital MAC unit $310.m_1$. At the end of the fifth processing cycle, digital MAC unit $310.m_5$ outputs element $o^2_1$.

After an initial delay of two processing cycles, digital MAC unit $310.m_6$ receives weights from digital MAC unit $310.m_2$ and input data from digital MAC unit $310.m_5$, transmits weights to digital MAC unit $310.m_{10}$ and input data to digital MAC unit $310.m_7$, and calculates the dot product of the second row of converted weight matrix 212 (i.e., converted weight set $212^2$) and the second column of converted input data matrix 214 to generate element $o^2_2$ of converted output data matrix 216. The initial delay of two processing cycles allows the weights to become available from digital MAC unit $310.m_2$, and the input data to become available from digital MAC unit $310.m_5$. At the end of the sixth processing cycle, digital MAC unit $310.m_6$ outputs element $o^2_2$.

After an initial delay of three processing cycles, digital MAC unit $310.m_7$ receives weights from digital MAC unit $310.m_3$ and input data from digital MAC unit $310.m_6$, transmits weights to digital MAC unit $310.m_{11}$ and input data to digital MAC unit $310.m_8$, and calculates the dot product of the third row of converted weight matrix 212 (i.e., converted weight set $212^3$) and the second column of converted input data matrix 214 to generate element $o^2_3$ of converted output data matrix 216. The initial delay of three processing cycles allows the weights to become available from digital MAC unit $310.m_3$, and the input data to become available from digital MAC unit $310.m_6$. At the end of the seventh processing cycle, digital MAC unit $310.m_7$ outputs element $o^2_3$.

After an initial delay of four processing cycles, digital MAC unit $310.m_8$ receives weights from digital MAC unit $310.m_4$ and input data from digital MAC unit $310.m_7$, transmits weights to digital MAC unit $310.m_{12}$, and calculates the dot product of the fourth row of converted weight matrix 212 (i.e., converted weight set $212^4$) and the second column of converted input data matrix 214 to generate element $o^2_4$ of converted output data matrix 216. The initial delay of four processing cycles allows the weights to become available from digital MAC unit $310.m_4$, and the input data to become available from digital MAC unit $310.m_7$. At the end of the eighth processing cycle, digital MAC unit $310.m_8$ outputs element $o^2_4$.

The third row of digital MAC array 318 includes digital MAC units $m_9$, $m_{10}$, $m_{11}$ and $m_{12}$.

After an initial delay of two processing cycles, digital MAC unit $310.m_9$ receives weights from digital MAC unit $310.m_5$ and input data from a second delay register $ff_2$, transmits weights to digital MAC unit $310.m_{13}$ and input data to digital MAC unit $310.m_{10}$, and calculates the dot product of the first row of converted weight matrix 212 (i.e., converted weight set $212^1$) and the third column of converted input data matrix 214 to generate element $o^3_1$ of converted output data matrix 216. The initial delay of two processing cycles allows the delay pipeline (i.e., delay registers $ff_1$ and $ff_2$) to be filled with input data transferred from memory, and the weights to become available from digital MAC unit $310.m_5$. At the end of the sixth processing cycle, digital MAC unit $310.m_9$ outputs element $o^3_1$.

After an initial delay of three processing cycles, digital MAC unit $310.m_{10}$ receives weights from digital MAC unit $310.m_6$ and input data from digital MAC unit $310.m_9$, transmits weights to digital MAC unit $310.m_{14}$ and input data to digital MAC unit $310.m_{11}$, and calculates the dot product of the second row of converted weight matrix 212 (i.e., converted weight set $212^2$) and the third column of converted input data matrix 214 to generate element $o^3_2$ of converted output data matrix 216. The initial delay of three processing cycles allows the weights to become available from digital MAC unit $310.m_6$, and the input data to become available from digital MAC unit $310.m_9$. At the end of the seventh processing cycle, digital MAC unit $310.m_{10}$ outputs element $o^3_2$.

After an initial delay of four processing cycles, digital MAC unit $310.m_{11}$ receives weights from digital MAC unit $310.m_7$ and input data from digital MAC unit $310.m_{10}$, transmits weights to digital MAC unit $310.m_{15}$ and input data to digital MAC unit $310.m_{12}$, and calculates the dot product of the third row of converted weight matrix 212 (i.e., converted weight set $212^3$) and the third column of converted input data matrix 214 to generate element $o^3_3$ of converted output data matrix 216. The initial delay of four processing cycles allows the weights to become available from digital MAC unit $310.m_7$, and the input data to become available from digital MAC unit $310.m_{10}$. At the end of the eighth processing cycle, digital MAC unit $310.m_{11}$ outputs element $o^3_3$.

After an initial delay of five processing cycles, digital MAC unit $310.m_{12}$ receives weights from digital MAC unit $310.m_8$ and input data from digital MAC unit $310.m_{11}$, transmits weights to digital MAC unit $310.m_{16}$, and calculates the dot product of the fourth row of converted weight matrix 212 (i.e., converted weight set $212^4$) and the third column of converted input data matrix 214 to generate element $o^3_4$ of converted output data matrix 216. The initial delay of five processing cycles allows the weights to become available from digital MAC unit $310.m_8$, and the input data to become available from digital MAC unit $310.m_{11}$. At the end of the ninth processing cycle, digital MAC unit $310.m_{12}$ outputs element $o^3_4$.

The fourth row of digital MAC array 318 includes digital MAC units $m_{13}$, $m_{14}$, $m_{15}$ and $m_{16}$.

After an initial delay of three processing cycles, digital MAC unit $310.m_{13}$ receives weights from digital MAC unit $310.m_9$ and input data from a third delay register $ff_3$, transmits input data to digital MAC unit $310.m_{14}$, and calculates the dot product of the first row of converted weight matrix 212 (i.e., converted weight set $212^1$) and the fourth column of converted input data matrix 214 to generate element $o^4_1$ of converted output data matrix 216. The initial delay of three processing cycles allows the delay pipeline (i.e., delay registers $ff_1$, $ff_2$ and $ff_3$) to be filled with input data transferred from memory, and the weights to become available from digital MAC unit $310.m_9$. At the end of the seventh processing cycle, digital MAC unit $310.m_{13}$ outputs element $o^4_1$.

After an initial delay of four processing cycles, digital MAC unit $310.m_{14}$ receives weights from digital MAC unit $310.m_{10}$ and input data from digital MAC unit $310.m_{13}$, transmits input data to digital MAC unit $310.m_{15}$, and calculates the dot product of the second row of converted weight matrix 212 (i.e., converted weight set $212^2$) and the fourth column of converted input data matrix 214 to generate element $o^4_2$ of converted output data matrix 216. The initial delay of four processing cycles allows the weights to become available from digital MAC unit $310.m_{10}$, and the input data to become available from digital MAC unit $310.m_{13}$. At the end of the eighth processing cycle, digital MAC unit $310.m_{14}$ outputs element $o^4_2$.

After an initial delay of five processing cycles, digital MAC unit $310.m_{15}$ receives weights from digital MAC unit $310.m_{11}$ and input data from digital MAC unit $310.m_{14}$, transmits input data to digital MAC unit $310.m_{16}$, and calculates the dot product of the third row of converted weight matrix 212 (i.e., converted weight set $212^3$) and the fourth column of converted input data matrix 214 to generate element $o^4_3$ of converted output data matrix 216. The initial delay of five processing cycles allows the weights to become available from digital MAC unit $310.m_{11}$, and the input data to become available from digital MAC unit $310.m_{14}$. At the end of the ninth processing cycle, digital MAC unit $310.m_{15}$ outputs element $o^4_3$.

After an initial delay of six processing cycles, digital MAC unit $310.m_{16}$ receives weights from digital MAC unit $310.m_{12}$ and input data from digital MAC unit $310.m_{15}$, and calculates the dot product of the fourth row of converted weight matrix 212 (i.e., converted weight set $212^4$) and the fourth column of converted input data matrix 214 to generate element $o^4_4$ of converted output data matrix 216. The initial delay of six processing cycles allows the weights to become available from digital MAC unit $310.m_{12}$, and the input data to become available from digital MAC unit $310.m_{15}$. At the end of the tenth processing cycle, digital MAC unit $310.m_{16}$ outputs element $o^4_4$.

After the first quadrant $a_{q1}$ of converted input data matrix 214 has been processed, the next sequence of operations may begin in order to process the second quadrant $a_{q2}$ of converted input data matrix 214. After the second quadrant $a_{q2}$ of converted input data matrix 214 has been processed, the next sequence of operations may begin in order to process the third quadrant $a_{q3}$ of converted input data matrix 214. And, after the third quadrant $a_{q3}$ of converted input data matrix 214 has been processed, the final sequence of operations may begin in order to process the fourth quadrant $a_{q4}$ of converted input data matrix 214. Converted weight matrix 212 is accessed for each sequence of operations.

In one embodiment, digital MAC array 318 may wait until the final element $o^4_4$ of converted output data matrix 216 has been calculated at the end of the $10^{th}$ processing cycle before beginning the next sequence of operations for the next quadrant of converted input data matrix 214. In another embodiment, digital MAC array 318 may begin the next sequence of operations for the next quadrant of converted input data matrix 214 as soon as the first element $o^1_1$ of converted output data matrix 216 has been calculated at the end of the $4^{th}$ processing cycle. In this embodiment, digital MAC array 318 does not wait or suspend operations; instead, digital MAC array 318 continuously performs dot product calculations.

Each column of converted weight matrix 212 is read at the beginning of a processing cycle. The first column of converted weight matrix 212, i.e., weights $w^1_1$, $w^2_1$, $w^3_1$ and $w^4_1$, is read at the beginning of the first processing cycle; $w^1_1$ is provided to digital MAC unit $310.m_1$, $w^2_1$ is provided to the first delay register for digital MAC unit $310.m_2$, $w^3_1$ is provided to the first delay register $ff_1$ for digital MAC unit $310.m_3$, and $w^4_1$ is provided to the first delay register $ff_1$ for digital MAC unit $310.m_4$. Similarly, the second column of converted weight matrix 212, i.e., weights $w^1_2$, $w^2_2$, $w^3_2$ and $w^4_2$, is read at the beginning of the second processing cycle; $w^1_2$ is provided to digital MAC unit $310.m_1$, $w^2_2$ is provided to the first delay register $ff_1$ for digital MAC unit $310.m_2$, $w^3_2$ is provided to the first delay register $ff_1$ for digital MAC unit $310.m_3$, and $w^4_2$ is provided to the first delay register $ff_1$ for digital MAC unit $310.m_4$.

The third column of converted weight matrix 212, i.e., weights $w^1_3$, $w^2_3$, $w^3_3$ and $w^4_3$, is read at the beginning of the third processing cycle; $w^1_3$ is provided to digital MAC unit $310.m_1$, $w^2_3$ is provided to the first delay register $ff_1$ for digital MAC unit $310.m_2$, $w^3_3$ is provided to the first delay register $ff_1$ for digital MAC unit $310.m_3$, and $w^4_3$ is provided to the first delay register $ff_1$ for digital MAC unit $310.m_4$. And, the fourth column of converted weight matrix 212, i.e., weights $w^1_4$, $w^2_4$, $w^3_4$ and $w^4_4$, is read at the beginning of the fourth processing cycle; $w^1_4$ is provided to digital MAC unit $310.m_1$, $w^2_4$ is provided to the first delay register $ff_1$ for digital MAC unit $310.m_2$, $w^3_4$ is provided to the first delay register $ff_1$ for digital MAC unit $310.m_3$, and $w^4_4$ is provided to the first delay register $ff_1$ for digital MAC unit $310.m_4$.

Similarly, each row of a particular quadrant of converted input data matrix 214 is read at the beginning of a processing cycle. For example, the first row of the first quadrant $a_{q1}$ of converted input data matrix 214, i.e., elements $a_1$, $a_2$, $a_3$ and $a_4$, is read at the beginning of the first processing cycle; $a_1$ is provided to digital MAC unit $310.m_1$, $a_2$ is provided to the first delay register $ff_1$ for digital MAC unit $310.m_5$, $a_3$ is provided to the first delay register $ff_1$ for digital MAC unit $310.m_9$, and $a_4$ is provided to the first delay register $ff_1$ for digital MAC unit $310.m_{13}$. Similarly, the second row of the first quadrant $a_{q1}$ of converted input data matrix 214, i.e., elements $a_2$, $a_3$, $a_4$ and $a_5$, is read at the beginning of the second processing cycle; $a_2$ is provided to digital MAC unit $310.m_1$, $a_3$ is provided to the first delay register $ff_1$ for digital MAC unit $310.m_5$, $a_4$ is provided to the first delay register $ff_1$ for digital MAC unit $310.m_9$, and $a_5$ is provided to the first delay register $ff_1$ for digital MAC unit $310.m_{13}$.

The third row of the first quadrant $a_{q1}$ of converted input data matrix 214, i.e., elements $a_6$, $a_7$, $a_8$ and $a_9$, is read at the beginning of the third processing cycle; $a_6$ is provided to digital MAC unit $310.m_1$, $a_7$ is provided to the first delay register $ff_1$ for digital MAC unit $310.m_5$, $a_8$ is provided to the first delay register $ff_1$ for digital MAC unit $310.m_9$, and $a_9$ is provided to the first delay register $ff_1$ for digital MAC unit $310.m_{13}$. And, the fourth row of the first quadrant $a_{q1}$ of converted input data matrix 214, i.e., elements $a_7$, $a_8$, $a_9$ and $a_{10}$, is read at the beginning of the fourth processing cycle;

$a_7$ is provided to digital MAC unit 310.$m_1$, $a_8$ is provided to the first delay register $ff_1$ for digital MAC unit 310.$m_5$, $a_9$ is provided to the first delay register $ff_1$ for digital MAC unit 310.$m_9$, and an is provided to the first delay register $ff_1$ for digital MAC unit 310.$m_{13}$.

Figure 3B:
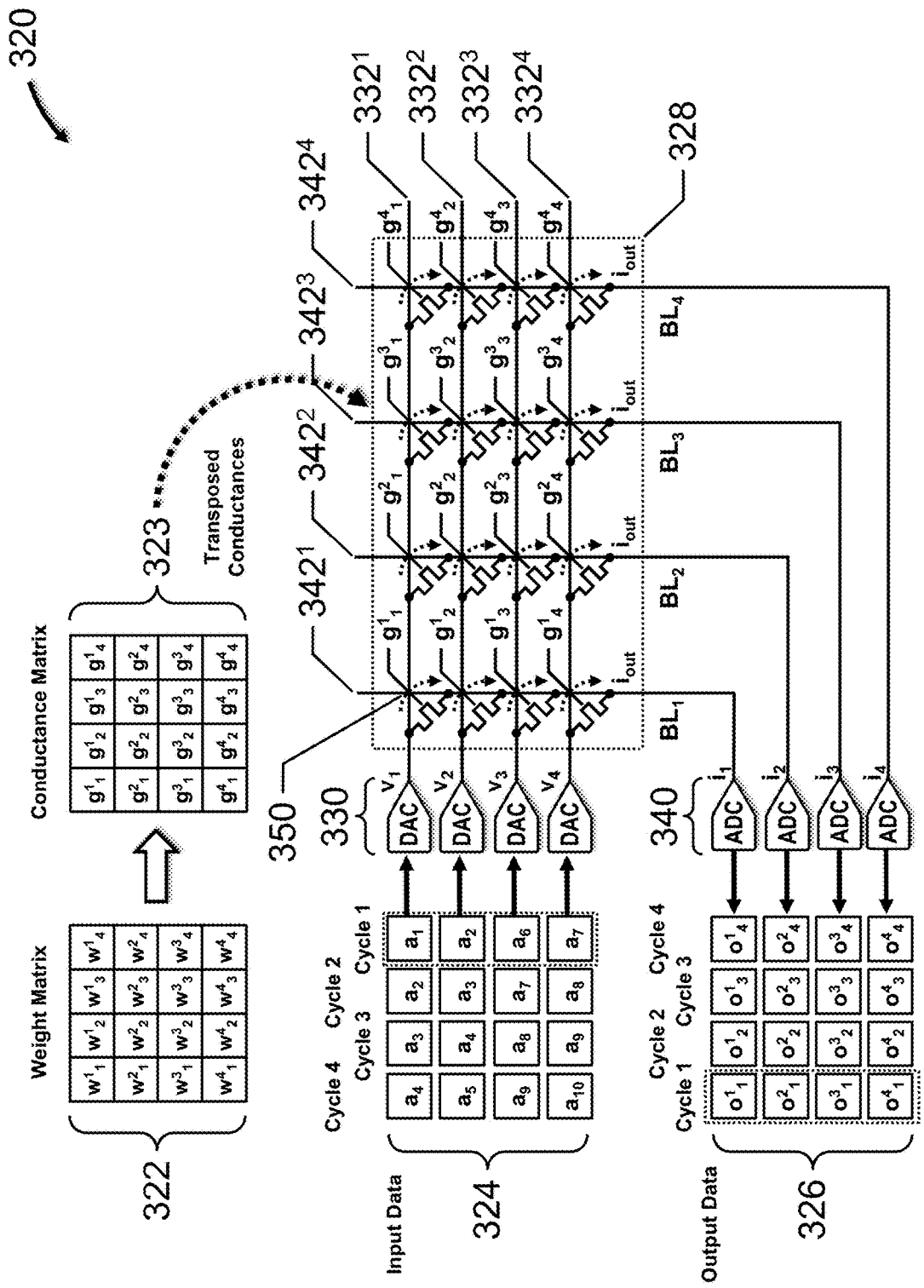
FIG. 3B depicts a data flow diagram for an analog NVM crossbar array.

FIG. 3B depicts a data flow diagram 320 for analog NVM crossbar array 328.

GEMM operations may be implemented in a dedicated ANN hardware accelerator that includes digital processing circuitry and one or more analog NVM crossbar arrays 328 that perform analog MAC operations. The digital processing circuitry includes digital-to-analog converters (DACs) 330 and analog-to-digital converters (ADCs) 340. The analog NVM crossbar array 328 includes analog NVM cells 350, each of which includes one or more programmable analog NVM elements, such as, for example, phase change memory (PCM), resistive random access memory (RRAM), magnetic RAM (MRAM), correlated electron RAM (CeRAM), etc. This approach relies on a combination of Ohm's law and Kirchhoff's current law to implement analog MAC operations in parallel.

According to Ohm's law, the application of a voltage across an analog NVM cell generates a current that is proportional to the voltage across the analog NVM cell divided by the programmed resistance of the analog NVM cell. Since conductance (in siemens) is the reciprocal of resistance (in ohms), the application of a voltage across an analog NVM cell generates a current that is proportional to the product of the conductance of the analog NVM cell and the voltage across the analog NVM cell. According to Kirchhoff's current law, currents from analog NVM cells in the same column of an analog NVM crossbar array combine to generate an accumulated current (i.e., the sum of the products generated by the analog NVM cells in that column, $i_{out}$). Thus, an analog NVM crossbar array implements analog MAC operations in parallel through the combination of Ohm's law and Kirchhoff's current law. The analog NVM element(s) within each analog NVM cell are programmed to a discrete conductance level that represents a weight value.

In data flow diagram 320, converted convolution operation 210 is implemented by DACs 330, ADCs 340 and analog NVM crossbar array 328. Analog NVM crossbar array 328 includes four row signal lines 332, i.e., row signal lines $332^1$, $332^2$, $332^3$ and $332^4$, four column signal lines 342, i.e., column signal lines $342^1$, $342^2$, $342^3$ and $342^4$, and sixteen analog NVM cells 350, one disposed at each intersection of row signal lines 332 and column signal lines 342. DACs 330 are coupled to row signal lines 332, and ADCs 340 are coupled to column signal lines 342. Each column of analog NVM cells 350 calculates a dot product, between a row of converted weight matrix 212 and a column of converted input data matrix 214, to generate an element of converted output data matrix 216.

Each analog NVM cell 350 includes one or more analog NVM resistive switching elements which have a low-resistance state (LRS), e.g., Ron, and a high-resistance state (HRS), e.g., $R_{off}$. Due to the wide separation between the LRS and the HRS, each analog NVM cell may be programmed to encode a discrete, linearly-separated conductance value. As depicted in data flow diagram 320, weights $w^1_1, w^1_2, w^1_3, w^1_4, w^2_1, w^2_2, w^2_3, w^2_4, w^3_1, w^3_2, w^3_3, w^3_4, w^4_1, w^4_2, w^4_3$, and $w^4_4$ (i.e., weight matrix 322) have been converted to conductances $g^1_1, g^1_2, g^1_3, g^1_4, g^2_1, g^2_2, g^2_3, g^2_4, g^3_1, g^3_2, g^3_3, g^3_4, g^4_1, g^4_2, g^4_3$, and $g^4_4$ (i.e., conductance matrix 323), and analog NVM cells 350 have been programmed with these conductance values.

Column data from converted input data matrix 214 are sequentially provided as input data matrix 324 to DACs 330, which output respective analog voltages $v_1, v_2, v_3$ and $v_4$ along row signal lines 332 across analog NVM crossbar array 328. Column signal lines 342 convey four corresponding bitline (BL) signals, i.e., $BL_1, BL_2, BL_3$, and $BL_4$, whose currents (i.e., $i_1, i_2, i_3$, and $i_4$) are proportional to the accumulated dot-products of input data matrix 324 (i.e., $v_1, v_2, v_3$ and $v_4$) and conductances $g^1_1, g^1_2, g^1_3, g^1_4, g^2_1, g^2_2, g^2_3, g^2_4, g^3_1, g^3_2, g^3_3, g^3_4, g^4_1, g^4_2, g^4_3$, and $g^4_4$ along column signal lines 342. The BL signals are then digitized using ADCs 340 to generate output data 326, i.e., the columns of converted output data matrix 216.

Converted output data matrix 216 has four rows, each of which is reformed into a separate output feature map $206_1$, $206_2$, $206_3$ and $206_4$. In order to calculate the first elements of each row of the converted output data matrix, i.e., element $o^1_1$ of output feature map $206^1$, element $o^2_1$ of output feature map $206^2$, element $o^3_1$ of output feature map $206^3$ and element $o^4_1$ of output feature map $206^4$, input data from the first column of converted input data matrix 214, i.e., activations $a_1, a_2, a_6$ and $a_7$, are input to DACs 330. DACs 330 then output respective analog voltages across analog NVM crossbar array 328 along row signal lines 332. Column signal lines 342 convey the BL signals to ADCs 340, which digitize the BL signals to obtain the first elements of the rows of the converted output data matrix. The remaining elements of the converted output data matrix are calculated in a similar manner.

An activation function and a bias may be applied to each element of the converted output data matrix to generate the elements of output feature maps 206, which are then provided as input feature maps 204 to the next layer. The activation function and bias may be applied after each element of the converted output data matrix is calculated, after all of the elements of the converted output data matrix are calculated, or by a subsequent locally-connected layer, such as an ReLU layer.

Embodiments of the present disclosure advantageously improve the distribution of operands in ANN accelerators by eliminating the need for flip-flops, ADCs and DACs. More particularly, digital operands are encoded as analog signals using digitally-controlled oscillators (DCOs) and digital-to-time converters (DTCs), and then distributed for processing by an array of mixed-signal (i.e., analog and digital) MAC units. Advantageously, analog operand distribution reduces hardware cost because a single wire can encode a continuous value which could represent as much data as, for example, an 8-wire digital signal, while the digital value that is output by each element of the mixed-signal MAC array avoids expensive ADCs.

Figure 4:
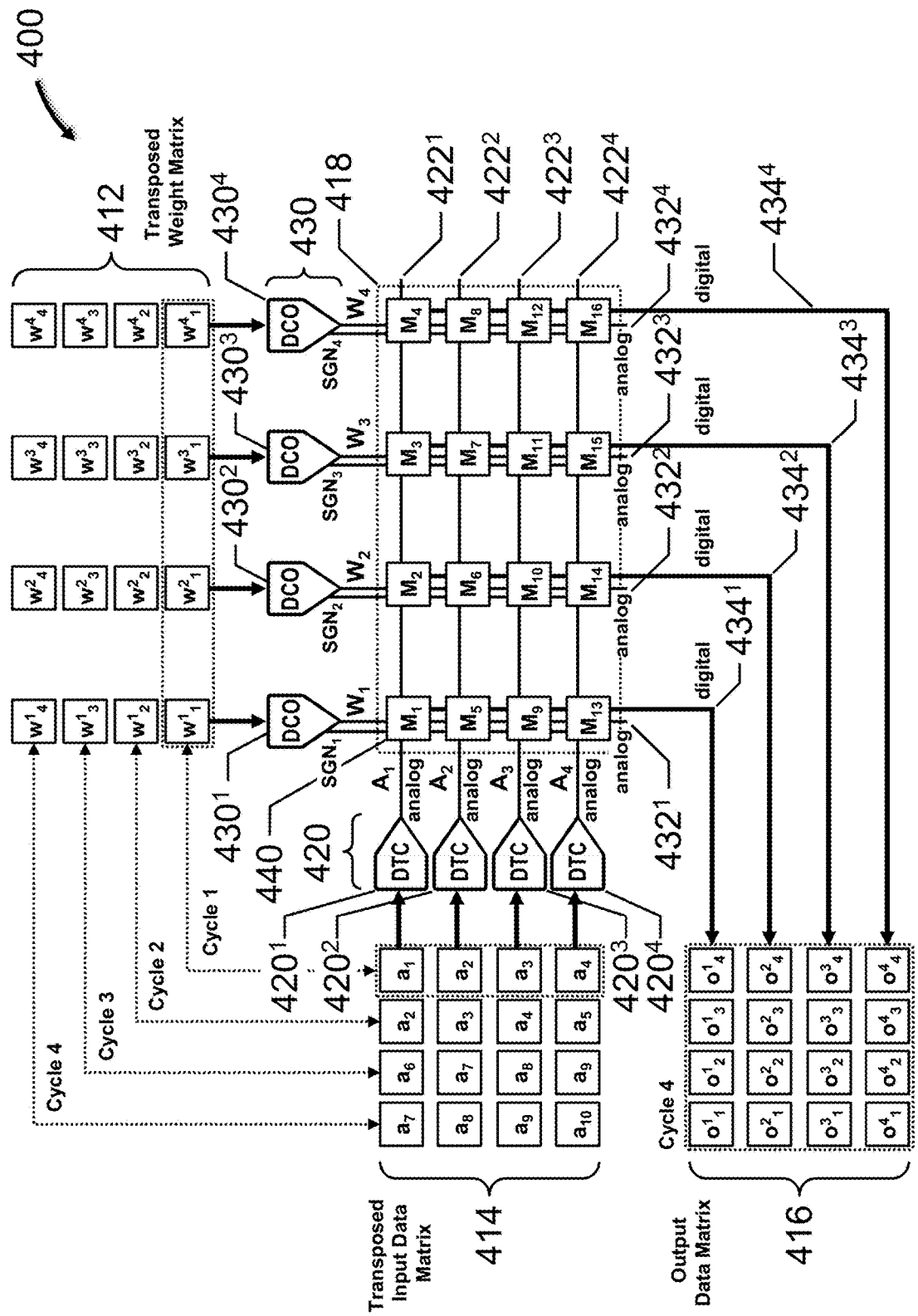
FIG. 4 depicts a data flow diagram for a mixed-signal MAC array, in accordance with an embodiment of the present disclosure.

FIG. 4 depicts a data flow diagram 400 for a mixed-signal MAC array 418, in accordance with an embodiment of the present disclosure.

Advantageously, GEMM operations may be implemented in a dedicated ANN hardware accelerator that includes digital processing circuitry and one or more mixed-signal MAC arrays 418 that perform output stationary, mixed-signal MAC operations. In this embodiment, mixed-signal MAC array 418 is an output stationary array that implements converted convolution operation 210 using a 4×4 array of mixed-signal MAC units 440.$M_1, \ldots,$ 440.$M_{16}$. Other embodiments have different array dimensions, such as, for example, 2×2, 3×3, 5×5, etc., as well as asymmetric arrays, such as, for example, 1×2, 2×3, 3×2, 2×4, 4×2, etc. The orientation of transposed weight matrix 412, transposed input data matrix 414, and output data matrix 416 relative to mixed-signal MAC array 418 simplifies illustration; other orientations are also contemplated. Each mixed-signal MAC unit 440 calculates a dot product, between a row of converted weight matrix 212 and a column of converted input data matrix 214, to generate an element of converted output data matrix 216.

The digital processing circuitry includes digital-to-time converters (DTCs) 420, i.e., DTC $420^1$, $420^2$, $420^3$ and $420^4$, and digitally-controlled oscillators (DCOs) 430, i.e., DCO $430^1$, $430^2$, $430^3$ and $430^4$ to generate analog operand signals. Mixed-signal MAC array 418 includes four row signal lines 422, i.e., row signal lines $422^1$, $422^2$, $422^3$ and $422^4$, four column signal lines 432, i.e., column signal lines $432^1$, $432^2$, $432^3$ and $432^4$, four sign signal lines associated with column signal lines 432, and sixteen mixed-signal MAC units $440.M_1, \ldots, 440.M_{16}$, one disposed at each intersection of row signal lines 422 and column signal lines 432. In certain embodiments, the weights are unsigned (e.g., unipolar or bipolar weights), and the mixed-signal MAC units 440 do not include sign signal lines.

DTCs 420 are coupled to row signal lines 422, while DCOs 430 are coupled to column signal lines 432. More particularly, DTC $420^1$ is coupled to row signal line $422^1$, DTC $420^2$ is coupled to row signal line $422^2$, DTC $420^3$ is coupled to row signal line $422^3$, and DTC $420^4$ is coupled to row signal line $422^4$. DCO $430^1$ is coupled to column signal line $432^1$, DCO $430^2$ is coupled to column signal line $432^2$, DCO $430^3$ is coupled to column signal line $432^3$, and DCO $430^4$ is coupled to column signal line $432^4$.

Mixed-signal MAC units $440.M_1$, $M_2$, $M_3$, and $M_4$ are coupled to row signal line $422^1$ and receive analog signal $A_1$. Mixed-signal MAC units $440.M_5$, $M_6$, $M_7$, and $M_8$ are coupled to row signal line $422^2$ and receive analog signal $A_2$. Mixed-signal MAC units $440.M_9$, $M_{10}$, $M_{11}$, and $M_{12}$ are coupled to row signal line $422^3$ and receive analog signal $A_3$. Mixed-signal MAC units $440.M_{13}$, $M_{14}$, $M_{15}$, and $M_{16}$ are coupled to row signal line $422^4$ and receive analog signal $A_4$. Similarly, mixed-signal MAC units $M_1$, $M_5$, $M_9$, and $M_{13}$ are coupled to column signal line $432^1$ and the associated signal line, and receive analog signal $W_1$ and signal $SGN_1$. Mixed-signal MAC units $M_2$, $M_6$, $M_{10}$, and $M_{14}$ are coupled to column signal line $432^2$ and the associated signal line, and receive analog signal $W_2$ and signal $SGN_2$. Mixed-signal MAC units $M_3$, $M_7$, $M_{11}$, and $M_{15}$ are coupled to column signal line $432^3$ and the associated signal line, and receive analog signal $W_3$ and signal $SGN_3$. Mixed-signal MAC units $M4_3$, $M_8$, $M_{12}$, and $M_{16}$ are coupled to column signal line $432^4$ and the associated signal line, and receive analog signal $W_4$ and signal $SGN_4$.

Generally, mixed-signal MAC unit 440 includes, inter alia, an integrated clock gate (ICG), a counter circuit and an output multiplexer. Each mixed-signal MAC unit 440 receives two analog operand signals and a sign signal, i.e., $A_i$, $W_i$ and $SGN_i$, and multiplies signals $W_i$ and $A_i$ by incrementing or decrementing a count value based on the interaction of signals $W_i$ and $A_i$ determined by the ICG and the value of signal $SGN_i$ (described in detail below). The count value is stored within a register in the counter circuit, and represents an intermediate value of the accumulated result until the dot product calculation is complete. The final count value is then output through the output multiplexer. This approach implements mixed-signal MAC operations in parallel. Each mixed-signal MAC unit 440 is reset by clearing or zeroing its counter circuit prior to, or at the start of, a new dot product calculation.

Column data from converted input data matrix 214 are sequentially provided as input data to DTCs 420, which convert the digital data to analog signals $A$, $A_2$, $A_3$ and $A_4$, which are output across mixed-signal MAC array 418 along row signal lines $422^1$, $422^2$, $422^3$ and $422^4$, respectively. Similarly, row data from converted weight matrix 212 are sequentially provided as weight data to DCOs 430, which convert the digital data to analog signals $W_1$, $W_2$, $W_3$ and $W_4$ and signals $SGN_1$, $SGN_2$, $SGN_3$ and $SGN_4$, which are output across mixed-signal MAC array 418 along column signal lines $432^1$, $432^2$, $432^3$ and $432^4$ and the four sign signal lines, respectively. Converted output data matrix 216 has four rows, each of which is reformed into a separate output feature map $206_1$, $206_2$, $206_3$ and $206_4$.

The dot product calculations performed by mixed-signal MAC units $440.M_1$, $440.M_2$, $440.M_3$ and $440.M_4$ for the first quadrant $a_{q1}$ of converted input data matrix 214 are discussed in detail below, while the dot product calculations performed by the remaining mixed-signal MAC units 440 for the first quadrant $a_{q1}$ are summarized below.

Mixed-signal MAC unit $440.M_1$ calculates the dot product of the first row of converted weight matrix 212 (i.e., converted weight set $212^1$) and the first column of converted input data matrix 214 to generate element $o^1_1$ of converted output data matrix 216. Mixed-signal MAC unit $440.M_2$ calculates the dot product of the second row of converted weight matrix 212 (i.e., converted weight set $212^2$) and the first column of converted input data matrix 214 to generate element $o^2_1$ of converted output data matrix 216. Mixed-signal MAC unit $440.M_3$ calculates the dot product of the third row of converted weight matrix 212 (i.e., converted weight set $212^3$) and the first column of converted input data matrix 214 to generate element $o^3_1$ of converted output data matrix 216. Mixed-signal MAC unit $440.M_4$ calculates the dot product of the fourth row of converted weight matrix 212 (i.e., converted weight set $212^4$) and the first column of converted input data matrix 214 to generate element $o^4_1$ of converted output data matrix 216.

During the first processing cycle, DTC $420^1$ receives element $a_1$ from memory, converts the digital value into analog signal $A_1$, and transmits analog signal $A_1$ along row signal line $422^1$. DCO $430^1$ receives element $w^1_1$ from memory, converts the digital value into analog signal $W_1$, and transmits analog signal $W_1$ along column signal line $432^1$. DCO $430^1$ also determines the sign of element $w^1_1$, i.e., positive or negative, and the generates and transmits the $SGN_1$ signal along the first sign signal line. DCO $430^2$ receives element $w^2_1$ from memory, converts the digital value into analog signal $W_2$, and transmits analog signal $W_2$ along column signal line $432^2$. DCO $430^2$ also determines the sign of element $w^2_1$, and the generates and transmits the $SGN_2$ signal along the first sign signal line. DCO $430^3$ receives element $w^3_1$ from memory, converts the digital value into analog signal $W_3$, and transmits analog signal $W_3$ along column signal line $432^3$. DCO $430^3$ also determines the sign of element $w^3_1$, and the generates and transmits the $SGN_3$ signal along the first sign signal line. DCO $430^4$ receives element $w^4_1$ from memory, converts the digital value into analog signal $W_4$, and transmits analog signal $W_4$ along column signal line $432^4$. DCO $430^4$ also determines the sign of element $w^4_1$, and the generates and transmits the $SGN_4$ signal along the first sign signal line.

Mixed-signal MAC unit $440.M_1$ receives analog signal $A_1$ along row signal line $422^1$, analog signal $W_1$ along column signal line $432^1$, and the signal $SGN_1$ along the first signal line, and multiplies $W_1$ ($w^1_1$) and $A_1$ ($a_1$) by incrementing or decrementing the counter circuit based on the interaction of signals $W_1$ and $A_1$ determined by the ICG and the value of the signal $SGN_1$. In one embodiment, the counter circuit is incremented when $SGN_1$ has a value of 1, and decremented when $SGN_1$ has a value of 0; other configurations are also contemplated. The counter circuit begins the first processing cycle with a value of zero, and ends the first processing cycle with a value equal to $w^1_1 \cdot a_1$, which is the first intermediate value of the accumulated result for the dot product calculation.

Mixed-signal MAC unit $440.M_2$ receives analog signal $A_1$ along row signal line $422^1$, analog signal $W_2$ along column signal line $432^2$, and the signal $SGN_2$ along the second signal line, and multiplies $W_2$ $(w^2_1)$ and $A_1$ $(a_1)$ by incrementing or decrementing the counter circuit based on the interaction of signals $W_2$ and $A_2$ determined by the ICG and the value of the signal $SGN_2$. The counter circuit begins the first processing cycle with a value of zero, and ends the first processing cycle with a value equal to $w^2_1 \cdot a_1$.

Mixed-signal MAC unit $440.M_3$ receives analog signal $A_1$ along row signal line $422^1$, analog signal $W_3$ along column signal line $432^3$, and the signal $SGN_3$ along the third signal line, and multiplies $W_3$ $(w^3_1)$ and $A_1$ $(a_1)$ by incrementing or decrementing the counter circuit based on the interaction of signals $W_3$ and $A_3$ determined by the ICG and the value of the signal $SGN_3$. The counter circuit begins the first processing cycle with a value of zero, and ends the first processing cycle with a value equal to $w^3_1 \cdot a_1$.

Mixed-signal MAC unit $440.M_4$ receives analog signal $A_1$ along row signal line $422^1$, analog signal $W_4$ along column signal line $432^4$, and the signal $SGN_4$ along the fourth signal line, and multiplies $W_4$ $(w^4_1)$ and $A_1$ $(a_1)$ by incrementing or decrementing the counter circuit based on the interaction of signals $W_4$ and $A_4$ determined by the ICG and the value of the signal $SGN_4$. The counter circuit begins the first processing cycle with a value of zero, and ends the first processing cycle with a value equal to $w^4_1 \cdot a_1$.

During the second processing cycle, DTC $420^1$ receives element $a_2$ from memory, converts the digital value into analog signal $A_1$, and transmits analog signal $A_1$ along row signal line $422^1$. DCO $430^1$ receives element $w^1_2$ from memory, converts the digital value into analog signal $W_1$, and transmits analog signal $W_1$ along column signal line $432^1$. DCO $430^1$ also determines the sign of element $w^1_2$, and the generates and transmits $SGN_1$ signal along the first sign signal line. DCO $430^2$ receives element $w^2_2$ from memory, converts the digital value into analog signal $W_2$, and transmits analog signal $W_2$ along column signal line $432^2$. DCO $430^2$ also determines the sign of element $w^2_2$, and the generates and transmits $SGN_2$ signal along the first sign signal line. DCO $430^3$ receives element $w^3_2$ from memory, converts the digital value into analog signal $W_3$, and transmits analog signal $W_3$ along column signal line $432^3$. DCO $430^3$ also determines the sign of element $w^3_2$, and the generates and transmits $SGN_3$ signal along the first sign signal line. DCO $430^4$ receives element $w^4_2$ from memory, converts the digital value into analog signal $W_4$, and transmits analog signal $W_4$ along column signal line $432^4$. DCO $430^4$ also determines the sign of element $w^4_2$, and the generates and transmits $SGN_4$ signal along the first sign signal line.

Mixed-signal MAC unit $440.M_1$ receives analog signal $A_1$ along row signal line $422^1$, analog signal $W_1$ along column signal line $432^1$, and the signal $SGN_1$ along the first signal line, and multiplies $W_1$ $(w^1_2)$ and $A_1$ $(a_2)$ by incrementing or decrementing the counter circuit based on the interaction of signals $W_1$ and $A_1$ determined by the ICG and the value of the signal $SGN_1$. The counter circuit begins the second processing cycle with a value of $w^1_1 \cdot a_1$, and ends the second processing cycle with a value equal to $w^1_2 \cdot a_2 + w^1_1 \cdot a_1$, which is the second intermediate value of the accumulated result for the dot product calculation.

Mixed-signal MAC unit $440.M_2$ receives analog signal $A_1$ along row signal line $422^1$, analog signal $W_2$ along column signal line $432^2$, and the signal $SGN_2$ along the second signal line, and multiplies $W_2$ $(w^2_2)$ and $A_1$ $(a_2)$ by incrementing or decrementing the counter circuit based on the interaction of signals $W_2$ and $A_2$ determined by the ICG and the value of the signal $SGN_2$. The counter circuit begins the second processing cycle with a value of $w^2_1 \cdot a_1$, and ends the second processing cycle with a value equal to $w^2_2 \cdot a_2 + w^2_1 \cdot a_1$.

Mixed-signal MAC unit $440.M_3$ receives analog signal $A_1$ along row signal line $422^1$, analog signal $W_3$ along column signal line $432^3$, and the signal $SGN_3$ along the third signal line, and multiplies $W_3$ $(w^3_2)$ and $A_1$ $(a_2)$ by incrementing or decrementing the counter circuit based on the interaction of signals $W_3$ and $A_3$ determined by the ICG and the value of the signal $SGN_3$. The counter circuit begins the second processing cycle with a value of $w^3_1 \cdot a_1$, and ends the second processing cycle with a value equal to $w^3_2 \cdot a_2 + w^3_1 \cdot a_1$.

Mixed-signal MAC unit $440.$ $M_4$ receives analog signal $A_1$ along row signal line $422^1$, analog signal $W_4$ along column signal line $432^4$, and the signal $SGN_4$ along the fourth signal line, and multiplies $W_4$ $(w^4_2)$ and $A_1$ $(a_2)$ by incrementing or decrementing the counter circuit based on the interaction of signals $W_4$ and $A_4$ determined by the ICG and the value of the signal $SGN_4$. The counter circuit begins the second processing cycle with a value of $w^4_1 \cdot a_1$, and ends the second processing cycle with a value equal to $w^4_2 \cdot a_2 + w^4_1 \cdot a_1$.

During the third processing cycle, DTC $420^1$ receives element $a_6$ from memory, converts the digital value into analog signal $A_1$, and transmits analog signal $A_1$ along row signal line $422^1$. DCO $430^1$ receives element $w^1_3$ from memory, converts the digital value into analog signal $W_1$, and transmits analog signal $W_1$ along column signal line $432^1$. DCO $430^1$ also determines the sign of element $w^1_3$, and the generates and transmits $SGN_1$ signal along the first sign signal line. DCO $430^2$ receives element $w^2_3$ from memory, converts the digital value into analog signal $W_2$, and transmits analog signal $W_2$ along column signal line $432^2$. DCO $430^2$ also determines the sign of element $w^2_3$, and the generates and transmits $SGN_2$ signal along the first sign signal line. DCO $430^3$ receives element $w^3_3$ from memory, converts the digital value into analog signal $W_3$, and transmits analog signal $W_3$ along column signal line $432^3$. DCO $430^3$ also determines the sign of element $w^3_3$, and the generates and transmits $SGN_3$ signal along the first sign signal line. DCO $430^4$ receives element $w^4_3$ from memory, converts the digital value into analog signal $W_4$, and transmits analog signal $W_4$ along column signal line $432^4$. DCO $430^4$ also determines the sign of element $w^4_3$, and the generates and transmits $SGN_4$ signal along the first sign signal line.

Mixed-signal MAC unit $440.M_1$ receives analog signal $A_1$ along row signal line $422^1$, analog signal $W_1$ along column signal line $432^1$, and the signal $SGN_1$ along the first signal line, and multiplies $W_1$ $(w^1_3)$ and $A_1$ $(a_6)$ by incrementing or decrementing the counter circuit based on the interaction of signals $W_1$ and $A_1$ determined by the ICG and the value of the signal $SGN_1$. The counter circuit begins the third processing cycle with a value of $w^1_2 \cdot a_2 + w^1_1 \cdot a_1$, and ends the third processing cycle with a value equal to $w^1_3 \cdot a_6 + w^1_2 \cdot a_2 + w^1_1 \cdot a_1$, which is the third intermediate value of the accumulated result for the dot product calculation.

Mixed-signal MAC unit $440.M_2$ receives analog signal $A_1$ along row signal line $422^1$, analog signal $W_2$ along column signal line $432^2$, and the signal $SGN_2$ along the second signal line, and multiplies $W_2$ ($w^2_3$) and $A_1$ ($a_6$) by incrementing or decrementing the counter circuit based on the interaction of signals $W_2$ and $A_2$ determined by the ICG and the value of the signal $SGN_2$. The counter circuit begins the third processing cycle with a value of $w^2_2 \cdot a_2 + w^2_1 \cdot a_1$, and ends the third processing cycle with a value equal to $w^2_3 \cdot a_6 + w^2_2 \cdot a_2 + w^2_1 \cdot a_1$.

Mixed-signal MAC unit $440.M_3$ receives analog signal $A_1$ along row signal line $422^1$, analog signal $W_3$ along column signal line $432^3$, and the signal $SGN_3$ along the third signal line, and multiplies $W_3$ ($w^3_3$) and $A_1$ ($a_6$) by incrementing or decrementing the counter circuit based on the interaction of signals $W_3$ and $A_3$ determined by the ICG and the value of the signal $SGN_3$. The counter circuit begins the third processing cycle with a value of $w^3_2 \cdot a_2 + w^3_1 \cdot a_1$, and ends the third processing cycle with a value equal to $w^3_3 \cdot a_6 + w^3_2 \cdot a_2 + w^3_1 \cdot a_1$.

Mixed-signal MAC unit $440. M_4$ receives analog signal $A_1$ along row signal line $422^1$, analog signal $W_4$ along column signal line $432^4$, and the signal $SGN_4$ along the fourth signal line, and multiplies $W_4$ ($w^4_3$) and $A_1$ ($a_6$) by incrementing or decrementing the counter circuit based on the interaction of signals $W_4$ and $A_4$ determined by the ICG and the value of the signal $SGN_4$. The counter circuit begins the third processing cycle with a value of $w^4_2 \cdot a_2 + w^4_1 \cdot a_1$, and ends the third processing cycle with a value equal to $w^4_3 \cdot a_6 + w^4_2 \cdot a_2 + w^4_1 \cdot a_1$.

During the fourth processing cycle, DTC $420^1$ receives element $a_7$ from memory, converts the digital value into analog signal $A_1$, and transmits analog signal $A_1$ along row signal line $422^1$. DCO $430^1$ receives element $w^1_4$ from memory, converts the digital value into analog signal $W_1$, and transmits analog signal $W_1$ along column signal line $432^1$. DCO $430^1$ also determines the sign of element $w^1_4$, and the generates and transmits $SGN_1$ signal along the first sign signal line. DCO $430^2$ receives element $w^2_4$ from memory, converts the digital value into analog signal $W_2$, and transmits analog signal $W_2$ along column signal line $432^2$. DCO $430^2$ also determines the sign of element $w^2_4$, and the generates and transmits $SGN_2$ signal along the first sign signal line. DCO $430^3$ receives element $w^3_4$ from memory, converts the digital value into analog signal $W_3$, and transmits analog signal $W_3$ along column signal line $432^3$. DCO $430^3$ also determines the sign of element $w^3_4$, and the generates and transmits $SGN_3$ signal along the first sign signal line. DCO $430^4$ receives element $w^4_4$ from memory, converts the digital value into analog signal $W_4$, and transmits analog signal $W_4$ along column signal line $432^4$. DCO $430^4$ also determines the sign of element $w^4_4$, and the generates and transmits $SGN_4$ signal along the first sign signal line.

Mixed-signal MAC unit $440.M_1$ receives analog signal $A_1$ along row signal line $422^1$, analog signal $W_1$ along column signal line $432^1$, and the signal $SGN_1$ along the first signal line, and multiplies $W_1$ ($w^1_4$) and $A_1$ ($a_7$) by incrementing or decrementing the counter circuit based on the interaction of signals $W_1$ and $A_1$ determined by the ICG and the value of the signal $SGN_1$. The counter circuit begins the fourth processing cycle with a value of $w^1_3 \cdot a_6 + w^1_2 \cdot a_2 + w^1_1 \cdot a_1$, and ends the fourth processing cycle with a value equal to $w^1_4 \cdot a_7 + w^1_3 \cdot a_6 + w^1_2 \cdot a_2 + w^1_1 \cdot a_1$, which is the fourth intermediate value of the accumulated result for the dot product calculation. The counter circuit value is then output as the result of the dot product calculation for element $o^1_1$.

Mixed-signal MAC unit $440.M_2$ receives analog signal $A_1$ along row signal line $422^1$, analog signal $W_2$ along column signal line $432^2$, and the signal $SGN_2$ along the second signal line, and multiplies $W_2$ ($w^2_4$) and $A_1$ ($a_7$) by incrementing or decrementing the counter circuit based on the interaction of signals $W_2$ and $A_2$ determined by the ICG and the value of the signal $SGN_2$. The counter circuit begins the fourth processing cycle with a value of $w^2_3 \cdot a_6 + w^2_2 \cdot a_2 + w^2_1 \cdot a_1$, and ends the fourth processing cycle with a value equal to $w^2_4 \cdot a_7 + w^2_3 \cdot a_6 + w^2_2 \cdot a_2 + w^2_1 \cdot a_1$. The counter circuit value is then output as the result of the dot product calculation for element $o^2_1$.

Mixed-signal MAC unit $440.M_3$ receives analog signal $A_1$ along row signal line $422^1$, analog signal $W_3$ along column signal line $432^3$, and the signal $SGN_3$ along the third signal line, and multiplies $W_3$ ($w^3_4$) and $A_1$ ($a_7$) by incrementing or decrementing the counter circuit based on the interaction of signals $W_3$ and $A_3$ determined by the ICG and the value of the signal $SGN_3$. The counter circuit begins the third processing cycle with a value of $w^3_3 \cdot a_6 + w^3_2 \cdot a_2 + w^3_1 \cdot a_1$, and ends the third processing cycle with a value equal to $w^3_4 \cdot a_7 + w^3_3 \cdot a_6 + w^3_2 \cdot a_2 + w^3_1 \cdot a_1$. The counter circuit value is then output as the result of the dot product calculation for element $o^3_1$.

Mixed-signal MAC unit $440.M_4$ receives analog signal $A_1$ along row signal line $422^1$, analog signal $W_4$ along column signal line $432^4$, and the signal $SGN_4$ along the fourth signal line, and multiplies $W_4$ ($w^4_4$) and $A_1$ ($a_7$) by incrementing or decrementing the counter circuit based on the interaction of signals $W_4$ and $A_4$ determined by the ICG and the value of the signal $SGN_4$. The counter circuit begins the third processing cycle with a value of $w^4_3 \cdot a_6 + w^4_2 \cdot a_2 + w^4_1 \cdot a_1$, and ends the third processing cycle with a value equal to $w^4_4 \cdot a_7 + w^4_3 \cdot a_6 + w^4_2 \cdot a_2 + w^4_1 \cdot a_1$. The counter circuit value is then output as the result of the dot product calculation for element $o^4_1$.

The second row of mixed-signal MAC array 418 includes mixed-signal MAC units $440.M_5$, $440.M_6$, $440.M_7$ and $440.M_8$.

Mixed-signal MAC unit $440.M_5$ calculates the dot product of the first row of converted weight matrix 212 (i.e., converted weight set $212^1$) and the second column of converted input data matrix 214 to generate element $o^1_2$ of converted output data matrix 216. Mixed-signal MAC unit $440.M_6$ calculates the dot product of the second row of converted weight matrix 212 (i.e., converted weight set $212^2$) and the second column of converted input data matrix 214 to generate element $o^2_2$ of converted output data matrix 216. Mixed-signal MAC unit $440.M_7$ calculates the dot product of the third row of converted weight matrix 212 (i.e., converted weight set $212^3$) and the second column of converted input data matrix 214 to generate element $o^3_2$ of converted output data matrix 216. Mixed-signal MAC unit $440.M_8$ calculates the dot product of the fourth row of converted weight matrix 212 (i.e., converted weight set $212^4$) and the second column of converted input data matrix 214 to generate element $o^4_2$ of converted output data matrix 216. These dot product calculations are performed in the same manner as those described above for the first row of mixed-signal MAC array 418, but use the second column of converted input data matrix 214 rather than the first column.

The third row of mixed-signal MAC array 418 includes mixed-signal MAC units $440.M_9$, $440.M_{10}$, $440.M_{11}$ and $440.M_{12}$.

Mixed-signal MAC unit $440.M_9$ calculates the dot product of the first row of converted weight matrix 212 (i.e., converted weight set $212^1$) and the third column of converted input data matrix 214 to generate element $o^1_3$ of converted output data matrix 216. Mixed-signal MAC unit 440.$M_{10}$ calculates the dot product of the second row of converted weight matrix 212 (i.e., converted weight set $212^2$) and the third column of converted input data matrix 214 to generate element $o^2_3$ of converted output data matrix 216. Mixed-signal MAC unit 440.$M_{11}$ calculates the dot product of the third row of converted weight matrix 212 (i.e., converted weight set $212^3$) and the third column of converted input data matrix 214 to generate element $o^3_3$ of converted output data matrix 216. Mixed-signal MAC unit 440.$M_{12}$ calculates the dot product of the fourth row of converted weight matrix 212 (i.e., converted weight set $212^4$) and the third column of converted input data matrix 214 to generate element $o^4_3$ of converted output data matrix 216. These dot product calculations are performed in the same manner as those described above for the first row of mixed-signal MAC array 418, but use the third column of converted input data matrix 214 rather than the first column.

The fourth row of mixed-signal MAC array 418 includes mixed-signal MAC units 440.$M_{13}$, 440.$M_{14}$, 440.$M_{15}$ and 440.$M_{16}$.

Mixed-signal MAC unit 440.$M_9$ calculates the dot product of the first row of converted weight matrix 212 (i.e., converted weight set $212^1$) and the fourth column of converted input data matrix 214 to generate element $o^1_4$ of converted output data matrix 216. Mixed-signal MAC unit 440.$M_{10}$ calculates the dot product of the second row of converted weight matrix 212 (i.e., converted weight set $212^2$) and the fourth column of converted input data matrix 214 to generate element $o^2_4$ of converted output data matrix 216. Mixed-signal MAC unit 440.$M_{11}$ calculates the dot product of the third row of converted weight matrix 212 (i.e., converted weight set $212^3$) and the fourth column of converted input data matrix 214 to generate element $o^3_4$ of converted output data matrix 216. Mixed-signal MAC unit 440.$M_{12}$ calculates the dot product of the fourth row of converted weight matrix 212 (i.e., converted weight set $212^4$) and the fourth column of converted input data matrix 214 to generate element $o^4_4$ of converted output data matrix 216. These dot product calculations are performed in the same manner as those described above for the first row of mixed-signal MAC array 418, but use the fourth column of converted input data matrix 214 rather than the first column.

After the first quadrant $a_{q1}$ of converted input data matrix 214 has been processed, the next sequence of operations may begin in order to process the second quadrant $a_{q2}$ of converted input data matrix 214. After the second quadrant $a_{q2}$ of converted input data matrix 214 has been processed, the next sequence of operations may begin in order to process the third quadrant $a_{q3}$ of converted input data matrix 214. And, after the third quadrant $a_{q3}$ of converted input data matrix 214 has been processed, the final sequence of operations may begin in order to process the fourth quadrant $a_{q4}$ of converted input data matrix 214. Converted weight matrix 212 is accessed for each sequence of operations.

An activation function and a bias may be applied to each element of the converted output data matrix to generate the elements of output feature maps 206, which are then provided as input feature maps 204 to the next layer. The activation function and bias may be applied after each element of the converted output data matrix is calculated, after all of the elements of the converted output data matrix are calculated, or by a subsequent locally-connected layer, such as an ReLU layer.

Figure 5:
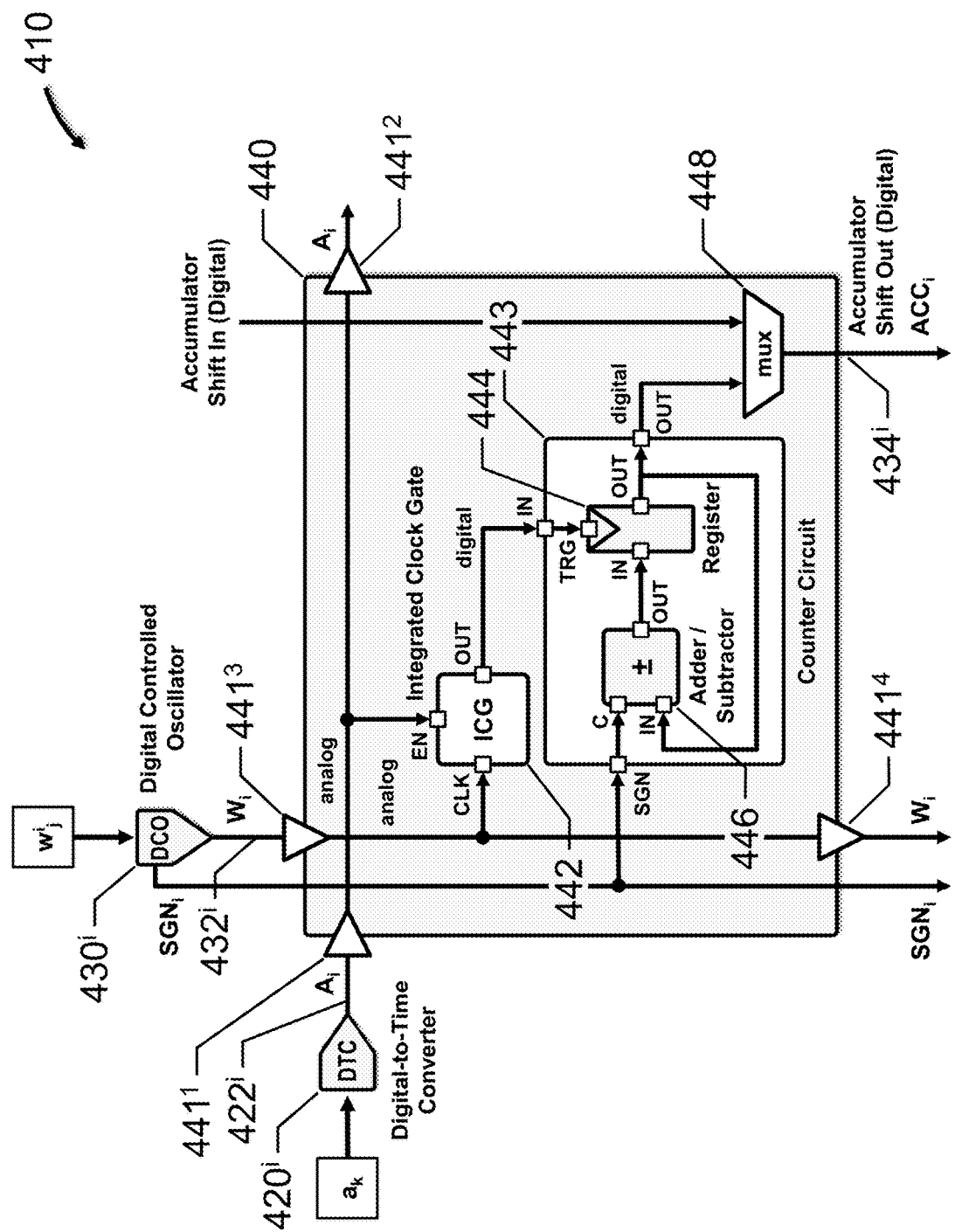
FIG. 5 depicts a block diagram of a mixed-signal MAC unit, in accordance with an embodiment of the present disclosure.

FIG. 5 depicts a block diagram 410 of mixed-signal MAC unit 440, in accordance with an embodiment of the present disclosure.

In one embodiment, mixed-signal MAC unit 440 includes ICG 442, counter circuit 443, and output multiplexer 448. ICG 442 includes an enable port (i.e., EN), a clock port (i.e., CLK) and an output port (i.e., OUT). The enable port is coupled row signal line $422^i$, and the clock port is coupled to column signal line $432^i$. Counter circuit 443 has an input port (i.e., IN), a sign signal port (i.e., SGN) and an output port (i.e., OUT). The input port is coupled to the output port of ICG 442, the sign signal port is coupled to the sign signal line that conveys the signal $SGN_i$, and the output port is coupled to output multiplexer 448. Counter circuit 443 includes register 444 and adder/subtractor circuit 446. Register 444 has a trigger port (i.e., TRG), an input port (i.e., IN) and an output port (i.e., OUT). The trigger port is coupled to the output port of ICG 442, and the output port is coupled to the output port of counter circuit 443. Adder/subtractor circuit 446 has a control port (i.e., C), an input port (i.e., IN) and an output port (i.e., OUT). The control port is coupled to the sign signal port of counter circuit 443, the input port is coupled to the output port of register 444, and the output port is coupled to the input port of register 444.

Mixed-signal MAC unit 440 receives two analog operand signals and the sign signal, i.e., signals $A_i$, $W_i$ and $SGN_i$. In certain embodiments, in order to maintain analog operand signal quality throughout mixed-signal MAC array 418, analog signal $A_i$ may be conditioned by buffers $441^1$ and $441^2$, and analog signal $W_i$ may be conditioned by buffers $441^3$ and $441^4$. Buffers $441^1$ and $441^2$ are coupled to row signal line $422^i$, and buffers $441^3$ and $441^4$ are coupled to column signal line $432^i$.

During each processing cycle, DTC $420^i$ receives an activation element $a_k$ from memory, encodes the digital value of $a_k$ into a pulse-width modulated (PWM) signal $A_i$, and transmits PWM signal $A_i$ along row signal line $422^i$. Similarly, DCO $430^i$ receives a weight element $w^1_j$ from memory, encodes the digital value of $w^1_j$ into a frequency modulated (FM) signal $W_i$, and transmits FM signal $W_i$ along column signal line $432^i$. DCO $430^i$ also determines the sign of weight element $w^i_j$, generates and transmits the signal $SGN_i$ along the $i^{th}$ sign signal line. When the sign of the weight element $w^1_j$ is positive, the signal $SGN_i$ is set to a first value (e.g., 1). Conversely, when the sign of the weight element $w^1_j$ is negative, the signal $SGN_i$ is set to a second value (e.g., 0). The signal $SGN_i$ may be a digital signal or an analog signal, and other values indicating whether counter circuit 443 increments or decrements that count value are also contemplated.

ICG 442 receives FM signal $W_i$ at the clock port, receives PWM signal $A_i$ at the enable port, gates the FM signal $W_i$ using the PWM signal $A_i$, and generates a digital product signal that is provided to counter circuit 443. The digital product signal includes a number of clock signal rising edges, which are integrated or counted by counter circuit 443. Register 444 receives the digital product signal at the trigger port, and, for each clock signal rising edge, register 444 outputs the count value from the output port, receives an updated count value at the input port, and stores the updated count value. Adder/subtractor circuit 446 receives the signal $SGN_i$ at the control port, and the count value at the input port. When the signal $SGN_i$ has the first value (e.g., 1), adder/subtractor circuit 446 increments the count value to generate the updated count value. Conversely, when the signal $SGN_i$ has the second value (e.g., 0), adder/subtractor circuit 446 decrements the count value to generate the updated count value. In one embodiment, adder/subtractor circuit 446 adds 1 to the count value to increment the count value, and subtracts 1 from the count value to decrement the count value. The updated count value is then output from the output port. In other words, the count value stored in register 444 will be incremented or decremented every time the clock signal rising edge occurs.

PWM signal $A_i$ is a binary signal having a fixed signal period and a programmable pulse width or duty cycle, i.e., PWM signal $A_i$ is "on" for a programmed amount of time during the PWM signal period and "off" during the remaining time of the PWM signal period. When PWM signal $A_i$ is "on," the voltage of PWM signal $A_i$ is high, and when PWM signal $A_i$ is "off," the voltage of PWM signal $A_i$ is low. Generally, the pulse width of PWM signal $A_i$ may be programmed to represent a digital activation value by dividing the signal period into a number of discrete pulse widths based on the bit-width of the digital value, and programming the pulse width to the digital activation value. For example, for a signal period of 1 second, a digital activation value having a bit-width of 8 bits (unsigned) and a value of 32, the signal period may be divided into 255 pulse widths (i.e., $2^8-1$), and the pulse width may be programmed to 32/255=0.125490 seconds (12.5% duty cycle). The smallest pulse width is 1/255 seconds.

FM signal $W_i$ is a sinusoidal signal having a programmable signal frequency. Generally, the signal frequency of FM signal $W_i$ may be programmed to represent a digital weight value based on the smallest pulse width of PWM signal $A_i$ and the bit-width of the digital weight value. For example, for a PWM signal $A_i$ with a smallest pulse width of 1/255 seconds (equivalent to 255 Hz), a digital weight value having a bit-width of 8 bits (unsigned) and a value of 32, the programmable frequencies may be divided into 255 discrete frequencies (i.e., $2^8-1$), each discrete frequency is a multiple of 255 Hz based on the smallest pulse width, and the frequency may be programmed to 32·255=8,160 Hz. The smallest frequency is 255 Hz.

In this example, ICG 442 gates the FM signal $W_i$ at 8,160 Hz using the PWM signal $A_i$ with a duty cycle of 12.5%. This process generates (8,160·0.125490)=1,024 clock edges that are output to counter circuit 443, which integrates or counts the number of edges to arrive at 1,024, which is the product of the digital activation value of 32 and the digital weight value of 32.

In another example, a digital activation value of 16 produces a pulse width of 0.062745 seconds (6.27% duty cycle), and a digital weight value of 64 produces a programmable frequency of 16,320 Hz. The ICG gating process generates 16,320·0.062745=1,024 clock edges that are output to counter circuit 443, which integrates or counts the number of edges to arrive at 1,024, which is the product of the digital activation value of 16 and the digital weight value of 64.

In a further example, a digital activation value of 1 produces a pulse width of 0.0039215 seconds (0.39% duty cycle), a digital weight value of 1 produces a programmable frequency of 255 Hz. The ICG gating process generates 255·0.0039215=1 clock edge that is output to counter circuit 443, which integrates or counts the number of edges to arrive at 1, which is the product of the digital activation value of 1 and the digital weight value of 1.

In a final example, a digital activation value of 127 produces a pulse width of 0.498039 seconds (49.8% duty cycle), a digital weight value of 127 produces a programmable frequency of 32,385 Hz. The ICG gating process generates 32,385·0.498039=16,129 clock edges that are output to counter circuit 443, which integrates or counts the number of edges to arrive at 16,129, which is the product of the digital activation value of 127 and the digital weight value of 127.

Generally, ICG 442 and counter circuit 443 implements a MAC operation given by Equation 1:

$$ACC[N]=FW \cdot TA+ACC[N-1] \qquad \text{Eq. 1}$$

where ACC[N] is the current count value, ACC[N−1] is the previous count value, FW is the FM signal $W_i$, and TA is the PWM signal $A_i$.

In other words, signals $W_i$ and $A_i$ are multiplied together by incrementing or decrementing the count value stored in register 444 based on the interaction of signals $W_i$ and $A_i$ determined by ICG 442 and the value of the signal $SGN_i$. The count value stored within register 444 represents an intermediate value of the accumulated result until the dot product calculation is complete. After the processing sequence for the dot product calculation is complete, the final count values may be shifted out from each mixed-signal MAC unit 440. In certain embodiments, this process may be similar to shifting out the accumulator values from a systolic, output stationary MAC array. In other embodiments, each mixed-signal MAC unit 440 may be directed coupled to an output register, and all of the final count values may be output at the same time.

Mixed-signal MAC units 440 provide many advantages over digital MAC units and analog NVM cells. Analog operand distribution does not require delay registers or flip-flops, and the number of wires per operand is reduced from 8 to 1. Most of the weights are zero or close to zero, so toggling on this wire should be low on average. The mixed-signal MAC operation is performed by an ICG and a simple counter circuit. For example, the digital MAC operation may be represented as a multiplication of two 8-bit operands followed by a 32-bit addition and storage of the result in a 32-bit accumulation register, i.e., 8·8+32»32, whereas the mixed-signal MAC operation may be represented as incrementing or decrementing a simple 32-bit counter by a particular amount, i.e., ±32.

Additionally, because the power consumption of the datapath is heavily proportional to the operand magnitudes and most weights are zero or small, non-zero values, mixed-signal MAC units 440 provide a big advantage over digital MAC units. Mixed-signal MAC units 440 do not require global clock distribution and pipelining latency for operands. And, while calibration may be required for DTCs 420 and DCOs 430 over pressure, voltage and temperature, i.e., PVT, compared to full analog voltage/current schemes, no ADCs are required which advantageously reduces area and power consumption.

The embodiment of mixed-signal MAC unit 440 discussed above has output stationary dataflow, frequency modulated weight operands and pulse width modulated activations. Other embodiments may include weight stationary or input stationary dataflow, as well as different encodings of the analog operands, such as, for example, digital, voltage, current, frequency, pulse width and pulse/edge position. These encoding may be used in various combinations for the two analog operands. Additionally, further embodiments contemplate three-dimensional (or higher) mixed-signal MAC arrays.

Figure 6:
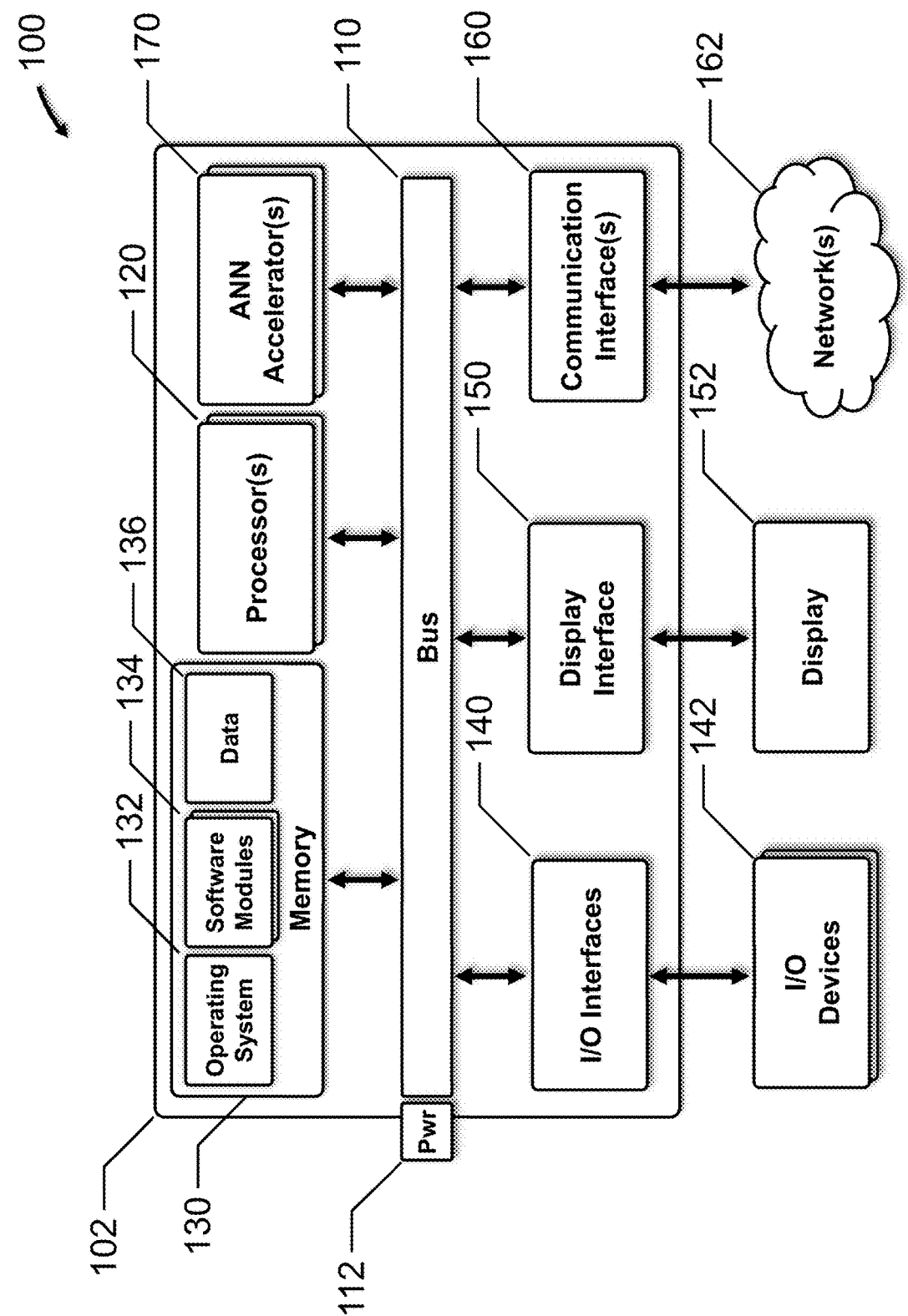
FIG. 6 depicts a block diagram of a system, in accordance with an embodiment of the present disclosure.

FIG. 6 depicts a block diagram of system 100, in accordance with an embodiment of the present disclosure.

Computer 102 includes communication bus 110 coupled to one or more processors 120, memory 130, I/O interfaces 140, display interface 150, one or more communication interfaces 160 and one or more ANN accelerators 170. Generally, I/O interfaces 140 are coupled to I/O devices 142 using a wired or wireless connection, display interface 150 is coupled to display 152, and communication interface 160 is connected to network 162 using a wired or wireless connection.

Communication bus 110 is a communication system that transfers data between processor 120, memory 130, I/O interfaces 140, display interface 150, communication interface 160, ANN accelerator 170, as well as other components not depicted. Power connector 112 is coupled to communication bus 110 and a power supply (not shown).

Processor 120 includes one or more general-purpose or application-specific microprocessors that executes instructions to perform control, computation, input/output, etc. functions for computer 102. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, software modules 134, etc., stored within memory 130. For example, software modules 134 may include an ML application, an ANN application, a CNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 102. Software modules 134 provide various functionality, such as image classification using convolutional neural networks, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to computer 102 and/or output from computer 102. As discussed above, I/O devices 142 are operably connected to computer 102 using a wired and/or wireless connection. I/O devices 142 may include a local processor coupled to a communication interface that is configured to communicate with computer 102 using the wired and/or wireless connection. For example, I/O devices 142 may include a keyboard, mouse, touch pad, joystick, etc.

Display interface 150 is configured to transmit image data from computer 102 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Figure 7:
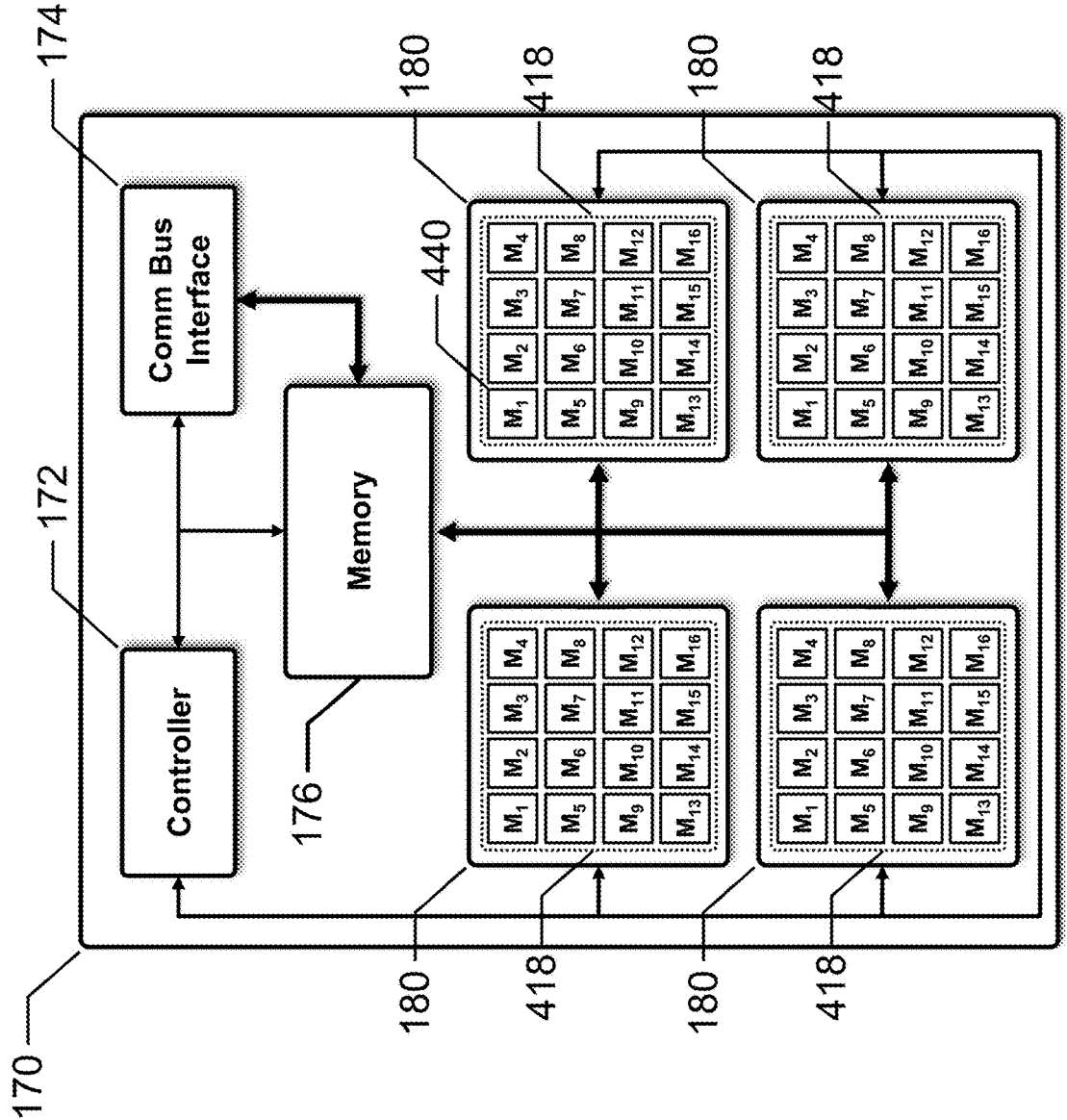
FIG. 7 depicts a block diagram of an ANN accelerator, in accordance with an embodiment of the present disclosure.

FIG. 7 depicts an ANN accelerator 170, in accordance with an embodiment of the present disclosure.

ANN accelerator 170 is configured to execute machine learning models, such as, for example, ANNs, CNNs, RNNs, etc., in support of various applications embodied by software modules 134. Generally, ANN accelerator 170 may include one or more processors, coprocessors, processing engines (PEs), compute engines (CEs), etc., such as, for example, CPUs, MCUs, GPUs, NPUs, such as, for example, the ARM Machine Learning (ML) Processor, DSPs, field programmable gate arrays (FPGAs), application specific integrated circuits (ASICs), controllers, microcontrollers, matrix multiplier circuits, MAC arrays, etc. Generally, ANN accelerator 170 receives input data from memory 130 over communication bus 110, and transmits output data to memory 130 over communication bus 110.

ANN accelerator 170 also includes controller 172, communications bus interface 174, and one or more non-volatile and/or volatile memories 176, such as, for example, ROM, flash memory, SRAM, DRAM, etc. Controller 172 is coupled to communication bus interface 174, memory 176 and one or more PEs 180, and generally controls the functionality, data flow, etc., of ANN accelerator 170. Memory 176 is coupled to communication bus interface 174 and PEs 180, and stores, inter alia, ANN weights and activations. Each PE 180 includes one or more mixed-signal MAC arrays 418, and each mixed-signal MAC array 418 includes a number of mixed-signal MAC units 440, such as, for example, 4 mixed-signal MAC units 440, 8 mixed-signal MAC units 440, 16 mixed-signal MAC units 440 (e.g., 440.$M_1$ to 440.$M_{16}$, as depicted in FIG. 7), 32 mixed-signal MAC units 440, etc.

Figure 8:
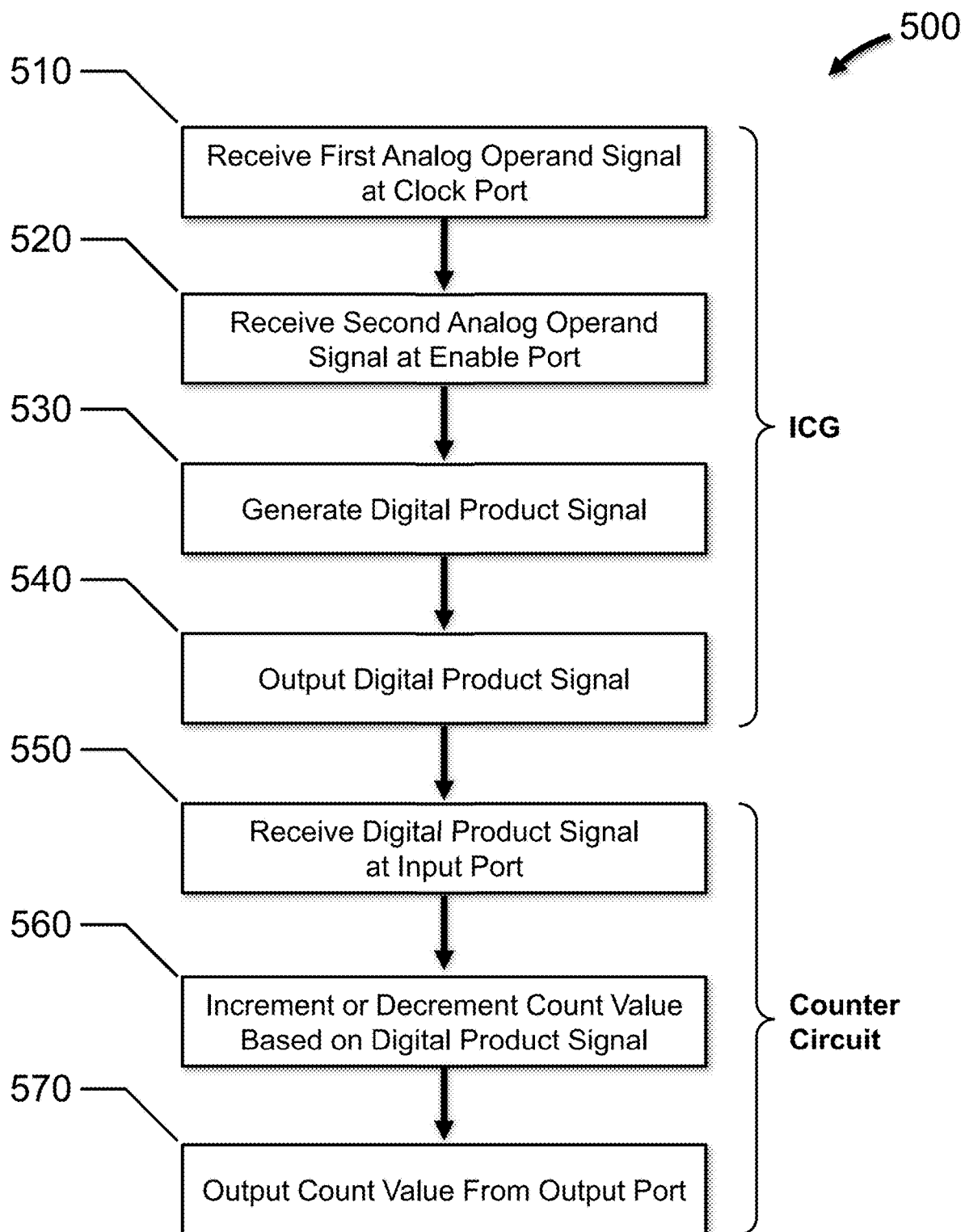
FIG. 8 depicts a depict flow diagram representing functionality associated with performing a mixed-signal MAC operation, in accordance with an embodiment of the present disclosure.

FIG. 8 depicts a depict flow diagram 500 representing functionality associated with performing a mixed-signal MAC operation, in accordance with an embodiment of the present disclosure.

ICG 442 includes a clock port coupled to a first analog operand signal line, an enable port coupled to a second analog operand signal line, and an output port. The functionality at 510, 520, 530 and 540 is performed at ICG 442.

At 510, a first analog operand signal is received at the clock port.

At 520, a second analog operand signal is received at the enable port.

At 530, a digital product signal is generated based on the first analog operand signal and the second analog operand signal.

At 540, the digital product signal is output from the output port.

Counter circuit 443 includes an input port coupled to the ICG output port, register 444, adder/subtractor circuit 446, and an output port. The functionality at 550, 560 and 570 is performed at counter circuit 443.

At 550, the digital product signal is received at the input port.

At 560, a count value stored in register 444 is incremented or decremented based on the digital product signal.

At 570, the count value is output from the output port.

Embodiments of the present disclosure advantageously improve the distribution of operands in ANN accelerators by eliminating the need for flip-flops, ADCs and DACs.

The embodiments described herein are combinable.

In one embodiment, an artificial neural network (ANN) accelerator includes a plurality of digital controlled oscillators (DCOs), a plurality of digital-to-time converters (DTCs), and a mixed-signal MAC array, coupled to row signal lines and column signal lines, including a plurality of mixed-signal MAC units. Each DCO is configured to receive a first digital data value, generate a first analog operand signal based on the first digital data value, and transmit the first analog operand signal along a respective column signal line. Each DTC is configured to receive a second digital data value, generate a second analog operand signal based on the second digital data value, and transmit the second analog operand signal along a respective row signal line. Each mixed-signal MAC unit includes an integrated clock gate (ICG) and a counter circuit. The ICG includes a clock port coupled to a column signal line, an enable port coupled to a row signal line, and an output port, and the ICG is configured to receive, at the clock port, the first analog operand signal transmitted along the column signal line, receive, at the enable port, the second analog operand signal transmitted along the row signal line, generate a digital product signal based on the first analog operand signal and the second analog operand signal, and output, from the output port, the digital product signal. The counter circuit includes an input port coupled to the ICG output port, a register, an adder/subtractor circuit, and an output port, and the counter circuit configured to receive, at the input port, the digital product signal, increment or decrement a count value stored in the register based on the digital product signal, and output, from the output port, the count value.

In another embodiment of the ANN accelerator, the first analog operand signal generated by each DCO is a frequency modulated (FM) signal; and the second analog operand signal generated by each DTC is a pulse-width modulated (PWM) signal.

In another embodiment of the ANN accelerator, generating a digital product signal includes gating the FM signal using the PWM signal.

In another embodiment of the ANN accelerator, the first digital data values are ANN weight values, and the second digital data values are ANN activation values.

In another embodiment of the ANN accelerator, the counter circuit includes a sign signal port, and the counter circuit is configured to receive, at the sign signal port, a sign signal having a first value or a second value, increment the count value of the register when the sign signal has the first value, and decrement the count value of the register when the sign signal has the second value.

In another embodiment of the ANN accelerator, each DCO is coupled to a respective sign signal line associated with the respective column signal line; each DCO is configured to generate a sign signal based on the first digital data value, the sign signal having the first value or the second value, and transmit the sign signal along the respective sign signal line; and, in each mixed-signal MAC unit, the counter circuit sign signal port is coupled to the sign signal line associated with the column signal line coupled to the ICG clock port.

In another embodiment of the ANN accelerator, the digital product signal includes a plurality of clock signal rising edges; the register includes a trigger port coupled to the counter circuit input port, an input port, and an output port coupled to the counter circuit output port; the adder/subtractor circuit includes a control port coupled to the counter circuit sign signal port, an input port coupled to the register output port, and an output port coupled to the register input port; the register is configured to receive, at the trigger port, the digital product signal, and, for each clock signal rising edge, output, from the output port, the count value, receive, at the input port, an updated count value, and store the updated count value; and the adder/subtractor circuit is configured to receive, at the control port, the sign signal, receive, at the input port, the count value, increment the count value to generate the updated count value when the sign signal has the first value, decrement the count value to generate the updated count value when the sign signal has the second value, and output, from the output port, the updated count value.

In another embodiment of the ANN accelerator, the adder/subtractor circuit is configured to add 1 to the count value to increment the count value, and subtract 1 from the count value to decrement the count value.

In one embodiment, a mixed-signal multiply-and-accumulate (MAC) unit includes an integrated clock gate (ICG) and a counter circuit. The ICG includes a clock port coupled to a first analog operand signal line, an enable port coupled to a second analog operand signal line, and an output port, and the ICG configured to receive, at the clock port, a first analog operand signal, receive, at the enable port, a second analog operand signal, generate a digital product signal based on the first analog operand signal and the second analog operand signal, and output, from the output port, the digital product signal. The counter circuit includes an input port coupled to the ICG output port, a register, an adder/subtractor circuit, and an output port, and the counter circuit configured to receive, at the input port, the digital product signal, increment or decrement a count value stored in the register based on the digital product signal, and output, from the output port, the count value.

In another embodiment of the mixed-signal MAC unit, the first analog operand signal is a frequency modulated (FM) signal, and the second analog operand signal is a pulse-width modulated (PWM) signal.

In another embodiment of the mixed-signal MAC unit, generating a digital product signal includes gating the FM signal using the PWM signal.

In another embodiment of the mixed-signal MAC unit, the FM signal is based on an artificial neural network (ANN) weight value, and the PWM signal is based on an ANN activation value.

In another embodiment of the mixed-signal MAC unit, the counter circuit includes a sign signal port, and the counter circuit is configured to receive, at the sign signal port, a sign signal associated with the FM signal, the sign signal having a first value or a second value; increment the count value of the register when the sign signal has the first value; and decrement the count value of the register when the sign signal has the second value.

In another embodiment of the mixed-signal MAC unit, the digital product signal includes a plurality of clock signal rising edges; the register includes a trigger port coupled to the counter circuit input port, an input port, and an output port coupled to the counter circuit output port; the adder/subtractor circuit includes a control port coupled to the counter circuit sign signal port, an input port coupled to the register output port, and an output port coupled to the register input port; the register is configured to receive, at the trigger port, the digital product signal, and, for each clock signal rising edge, output, from the output port, the count value, receive, at the input port, an updated count value, and store the updated count value; and the adder/subtractor circuit is configured to receive, at the control port, the sign signal, receive, at the input port, the count value, increment the count value when the sign signal has the first value to generate the updated count value, decrement the count value when the sign signal has the second value to generate the updated count value, and output, from the output port, the updated count value.

In another embodiment of the mixed-signal MAC unit, the adder/subtractor circuit is configured to add 1 to the count value to increment the count value, and subtract 1 from the count value to decrement the count value.

In one embodiment, a method for performing a mixed-signal multiply-and-accumulate (MAC) operation includes, at an integrated clock gate (ICG) including a clock port coupled to a first analog operand signal line, an enable port coupled to a second analog operand signal line, and an output port: receiving, at the clock port, a first analog operand signal, receiving, at the enable port, a second analog operand signal, generating a digital product signal based on the first analog operand signal and the second analog operand signal, and outputting, from the output port, the digital product signal; and, at a counter circuit including an input port coupled to the ICG output port, a register, an adder/subtractor circuit, and an output port: receiving, at the input port, the digital product signal, incrementing or decrementing a count value stored in the register based on the digital product signal, and outputting, from the output port, the count value.

In another embodiment of the method, the first analog operand signal is a frequency modulated (FM) signal, and the second analog operand signal is a pulse-width modulated (PWM) signal.

In another embodiment of the method, generating a digital product signal includes gating the FM signal using the PWM signal.

In another embodiment of the method, the method further includes, at a digital controlled oscillator (DCO), receiving a first digital data value, generating the FM signal based on the first digital data value, generating a sign signal based on the first digital data value, the sign signal having a first value or a second value, transmitting the FM signal along the first analog operand signal line, and transmitting the sign signal along a sign signal line associated with the first analog operand signal line; at a digital-to-time converter (DTC): receiving a second digital data value, generating the PWM signal based on the second digital data value, and transmitting the PWM signal along the second analog operand signal line; and at the counter circuit: receiving the sign signal, incrementing the count value of the register when the sign signal has the first value, and decrementing the count value of the register when the sign signal has the second value.

In another embodiment of the method, the first digital data value is an artificial neural network (ANN) weight value, and the second digital data value is an ANN activation value.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An artificial neural network (ANN) accelerator, comprising:
    a plurality of digital controlled oscillators (DCOs), each DCO configured to:
        receive a first digital data value,
        generate a first analog operand signal based on the first digital data value, and transmit the first analog operand signal along a respective column signal line; and
        generate a sign signal based on the first digital data value, the sign signal having a first value or a second value, and transmit the sign signal along a respective sign signal line;
    a plurality of digital-to-time converters (DTCs), each DTC configured to receive a second digital data value, generate a second analog operand signal based on the second digital data value, and transmit the second analog operand signal along a respective row signal line; and
    a mixed-signal MAC array, coupled to the sign signal lines, the row signal lines and the column signal lines, including a plurality of mixed-signal MAC units, each mixed-signal MAC unit including:
        an integrated clock gate (ICG), including a clock port, an enable port and an output port, the clock port coupled to a column signal line, the enable port coupled to a row signal line, the ICG configured to:
            receive, at the clock port, the first analog operand signal transmitted along the column signal line,
            receive, at the enable port, the second analog operand signal transmitted along the row signal line,
            generate a digital product signal based on the first analog operand signal and the second analog operand signal, and
            output, from the output port, the digital product signal, and
        a counter circuit, including an input port, a sign signal port, a register, an adder/subtractor circuit and an output port, the input port coupled to the ICG output port and the sign signal port coupled to the sign signal line associated with the column signal line coupled to the ICG clock port, the counter circuit configured to:
            receive, at the input port, the digital product signal,
            receive, at the sign signal port, the sign signal,
            increment a count value stored in the register based on the digital product signal when the sign signal has the first value,
            decrement the count value of the register based on the digital product signal when the sign signal has the second value,
            and
            output, from the output port, the count value.

2. The ANN accelerator of claim 1, where:
    the first analog operand signal generated by each DCO is a frequency modulated (FM) signal; and
    the second analog operand signal generated by each DTC is a pulse-width modulated (PWM) signal.

3. The ANN accelerator of claim 2, where said generate a digital product signal includes gating the FM signal using the PWM signal.

4. The ANN accelerator of claim 3, where the first digital data values are ANN weight values, and the second digital data values are ANN activation values.

5. The ANN accelerator of claim 1, where:
    the digital product signal includes a plurality of clock signal rising edges;
    the register includes a trigger port coupled to the counter circuit input port, an input port, and an output port coupled to the counter circuit output port;
    the adder/subtractor circuit includes a control port coupled to the counter circuit sign signal port, an input port coupled to the register output port, and an output port coupled to the register input port;
    the register is configured to:
        receive, at the trigger port, the digital product signal, and
        for each clock signal rising edge:
            output, from the output port, the count value,
            receive, at the input port, an updated count value, and
            store the updated count value; and
    the adder/subtractor circuit is configured to:
        receive, at the control port, the sign signal,
        receive, at the input port, the count value,
        when the sign signal has the first value, increment the count value to generate the updated count value,
        when the sign signal has the second value, decrement the count value to generate the updated count value,
        and
        output, from the output port, the updated count value.

6. The ANN accelerator of claim 5, where the adder/subtractor circuit is configured to add 1 to the count value to increment the count value, and subtract 1 from the count value to decrement the count value.

7. A mixed-signal multiply-and-accumulate (MAC) unit, comprising:
    an integrated clock gate (ICG), including a clock port, an enable port and an output port, the clock port coupled to a first analog operand signal line, the enable port coupled to a second analog operand signal line, the ICG configured to:
        receive, at the clock port, a first analog operand signal,
        receive, at the enable port, a second analog operand signal,
        generate a digital product signal based on the first analog operand signal and the second analog operand signal, the digital product signal including a plurality of clock signal rising edges and
        output, from the output port, the digital product signal; and a counter circuit, including an input port, a register, an adder/subtractor circuit and an output port, the input port coupled to the ICG output port, the counter circuit configured to:
 receive, at the input port, the digital product signal,
 increment or decrement a count value stored in the register based on the digital product signal, and
 output, from the output port, the count value,
where the register includes a trigger port coupled to the counter circuit input port, an input port, and an output port coupled to the counter circuit output port, and where the register is configured to:
 receive, at the trigger port, the digital product signal, and
 for each clock signal rising edge of the digital product signal:
  output, from the output port, the count value,
  receive, at the input port, an updated count value, and
  store the updated count value.

8. The mixed-signal MAC unit of claim 7, where:
the first analog operand signal is a frequency modulated (FM) signal; and
the second analog operand signal is a pulse-width modulated (PWM) signal.

9. The mixed-signal MAC unit of claim 8, where said generate a digital product signal includes gating the FM signal using the PWM signal.

10. The mixed-signal MAC unit of claim 9, where the FM signal is based on an artificial neural network (ANN) weight value, and the PWM signal is based on an ANN activation value.

11. The mixed-signal MAC unit of claim 9, where the counter circuit includes a sign signal port, and the counter circuit is configured to:
 receive, at the sign signal port, a sign signal associated with the FM signal, the sign signal having a first value or a second value;
 increment the count value of the register when the sign signal has the first value; and
 decrement the count value of the register when the sign signal has the second value.

12. The mixed-signal MAC unit of claim 11, where
the adder/subtractor circuit includes a control port coupled to the counter circuit sign signal port, an input port coupled to the register output port, and an output port coupled to the register input port;
the adder/subtractor circuit is configured to:
 receive, at the control port, the sign signal,
 receive, at the input port, the count value,
 when the sign signal has the first value, increment the count value to generate the updated count value,
 when the sign signal has the second value, decrement the count value to generate the updated count value, and
 output, from the output port, the updated count value.

13. The mixed-signal MAC unit of claim 12, where the adder/subtractor circuit is configured to add 1 to the count value to increment the count value, and subtract 1 from the count value to decrement the count value.

14. A method for performing a mixed-signal multiply-and-accumulate (MAC) operation, comprising:
 at an integrated clock gate (ICG) including a clock port, an enable port and an output port, the clock port coupled to a first analog operand signal line, the enable port coupled to a second analog operand signal line:
  receiving, at the clock port, a first analog operand signal,
  receiving, at the enable port, a second analog operand signal,
  generating a digital product signal based on the first analog operand signal and the second analog operand signal, and
  outputting, from the output port, the digital product signal;
 at a digital controlled oscillator (DCO):
  receiving a first digital data value,
  generating a sign signal based on the first digital data value, the sign signal having a first value or a second value,
  transmitting the sign signal along a sign signal line associated with the first analog operand signal line; and
 at a counter circuit including a sign input port coupled to the sign signal line, an input port coupled to the ICG output port, a register, an adder/subtractor circuit and an output port:
  receiving, at the input port, the digital product signal,
  receiving, at the sign input port, the sign signal,
  incrementing a count value stored in the register based on the digital product signal when the sign signal has the first value, and
  decrementing the count value of the register based on the digital product signal when the sign signal has the second value,
and
 outputting, from the output port, the count value.

15. The method of claim 14, where:
the first analog operand signal is a frequency modulated (FM) signal; and
the second analog operand signal is a pulse-width modulated (PWM) signal.

16. The method of claim 15, where said generating a digital product signal includes gating the FM signal using the PWM signal.

17. The method of claim 16, further comprising:
 at the digital controlled oscillator (DCO):
  generating the FM signal based on the first digital data value,
  transmitting the FM signal along the first analog operand signal line,
 at a digital-to-time converter (DTC):
  receiving a second digital data value,
  generating the PWM signal based on the second digital data value, and
  transmitting the PWM signal along the second analog operand signal line.

18. The method of claim 17, where the first digital data value is an artificial neural network (ANN) weight value, and the second digital data value is an ANN activation value.

* * * * *